(12) United States Patent
Yoshida

(10) Patent No.: US 7,099,625 B1
(45) Date of Patent: Aug. 29, 2006

(54) AUTOMOBILE COMMUNICATIONS METHOD AND SYSTEM

(75) Inventor: Yasuharu Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/348,169

(22) Filed: Jul. 7, 1999

(30) Foreign Application Priority Data

Jul. 7, 1998 (JP) .................................. 10-207145

(51) Int. Cl.
*H04B 15/00* (2006.01)

(52) U.S. Cl. ........................ 455/62; 455/450; 455/446; 370/329

(58) Field of Classification Search ................ 370/328, 370/329, 330, 331, 336, 343, 345, 349, 332, 370/342, 228, 347, 281, 295, 436, 478, 337, 370/230; 455/62, 63, 446, 447, 450, 451, 455/452, 442, 436, 432, 509, 69, 522, 328, 455/329, 330, 331, 336, 343, 345, 349, 63.1
See application file for complete search history.

(56) References Cited

U.S. PATENT DOCUMENTS

| | | | | |
|---|---|---|---|---|
| 5,127,100 | A * | 6/1992 | D'Amico et al. | 455/422 |
| 5,159,593 | A * | 10/1992 | D'Amico et al. | 370/332 |
| 5,345,448 | A | 9/1994 | Keskitalo | |
| 5,390,235 | A | 2/1995 | Beasley | |
| 5,448,751 | A | 9/1995 | Takenaka et al. | |
| 5,557,603 | A * | 9/1996 | Barlett et al. | 370/228 |
| 5,737,329 | A * | 4/1998 | Horiguchi | 370/342 |
| 5,822,313 | A * | 10/1998 | Malek et al. | 370/332 |
| 5,859,841 | A * | 1/1999 | Gitlits | 370/335 |
| 5,901,114 | A | 5/1999 | Baravian et al. | |
| 5,937,333 | A * | 8/1999 | Sexton et al. | 455/73 |
| 6,072,842 | A * | 6/2000 | Janesch et al. | 375/326 |
| 6,128,287 | A * | 10/2000 | Freegurg et al. | 370/331 |
| 6,131,033 | A * | 10/2000 | Shi | 455/446 |
| 6,310,867 | B1 * | 10/2001 | Tat et al. | 370/330 |

FOREIGN PATENT DOCUMENTS

| | | |
|---|---|---|
| CA | 2106017 | 3/1995 |
| CA | 2166832 | 7/1996 |
| EP | 0 199 266 | 10/1986 |
| JP | 1-218138 | 8/1989 |
| JP | 2-186843 | 7/1990 |
| JP | 8-340569 | 12/1996 |

OTHER PUBLICATIONS

European Search Report dated Feb. 16, 2000.
Japanese Office Action dated Apr. 25, 2000 with partial translation.

(Continued)

*Primary Examiner*—Charles N. Appiah
*Assistant Examiner*—Nghi H. Ly
(74) *Attorney, Agent, or Firm*—McGinn IP Law Group,PLLC

(57) ABSTRACT

An automobile communication system which can ensure fast hand-over without putting unnecessary burden on mobile stations and can adequately handle changes in road condition is disclosed. For each of the radio zones formed by roadside transceivers arranged along a road, a plurality of transmission and reception frequencies $f_{t1}/f_{r1}$ and $f_{t2}/f_{r2}$ are provided. The in-use transmission/reception frequencies in adjoining radio zones are switched at predetermined timing such that they are not permitted to be overlapped. By switching a time slot allocated to the vehicle-mounted transceiver, the vehicle-mounted transceiver can continuously communicate with the roadside transceivers at the same communication frequency over the radio zones.

50 Claims, 11 Drawing Sheets

OTHER PUBLICATIONS

European Communication pursuant to Aticle 96(2) EPC dated June 4, 2002.
Canadian Office Action dated Nov. 26, 2001.
European Patent Office Communication dated Aug. 12, 2005.

Mouly, et al. "The GSM System for Mobile Communications", pp. 45-46, 195-197, 327-329, no date listed.
Canadian Office Action dated Aug. 9, 2004.
Canadian Office Action dated Mar. 25, 2003.

* cited by examiner

AUTOMOBILE COMMUNICATIONS METHOD AND SYSTEM

BACKGROUND OF THE INVENTION

1. Field of the Invention

The present invention relates to a mobile communications system, and, more particularly, to a communication system and method for mobile units moving on a road.

2. Description of the Related Art

Recently, studies have been made on various ITSs (Intelligent Transport Systems) to aim at improving the traffic safety and efficiency, traffic environment, etc. To realize such an ITS, it is essential to implement information transmission means, which is the functional core of the system. i.e., an automobile communications system which connects between vehicle-mounted mobile communication devices and roadside transceivers by radio.

Such an automobile communications system may be realized based on the existing mobile telephone system. One example of this automobile communications system is provided with roadside transceivers deployed along a road to segment the road into consecutive radio zones. Such a configuration allows continuous communication with an on-board transceiver of a vehicle running on the road while performing so-called hand-over. Each roadside transceiver is connected to a central station, which gathers information from vehicles and up-links it to a host station or gives information and instructions necessary for road travel to the vehicles. The hand-over command is usually sent from the central station.

A transmission center frequency $f_{t1}$ and a reception center frequency $f_{r1}$ are assigned to odd zones in the consecutive radio zones, and a transmission center frequency $f_{t2}$ and a reception center frequency $f_{r2}$ are assigned to even zones. The switching of the frequencies is performed to prevent interference between adjoining radio zones. For areas which geographically suffers intense radio wave interference, such as those where radio waves can reach very far, it is necessary to repeatedly assign three or more radio waves.

According to such an automobile communications system, when a vehicle moves from an odd radio zone 1 into an adjoining even radio zone 2, for example, the on-board transceiver should perform so-called hand-over by switching the opposite party from the roadside transceiver of the radio zone 1 to that of the radio zone 2. At this time, the transmission center frequency of the roadside transceiver changes from $f_{t1}$ to $f_{t2}$, so that the reception center frequency of the on-board transceiver also changes from $f_{r1}$ to $f_{r2}$. This requires that the oscillation frequency of the voltage controlled oscillator of the on-board transceiver should be switched to the center frequency necessary for synchronous detection and demodulation. At the same time, since the reception center frequency of the roadside transceiver changes from $f_{r1}$ to $f_{r2}$, the transmission center frequency of the on-board transceiver must also be switched from $f_{r1}$ to $f_{r2}$. When the vehicle enters an odd radio zone 3 from the even radio zone 2, likewise, the oscillation frequency of the voltage controlled oscillator of the on-board transceiver should be switched from $f_{r2}$ to $f_{r1}$ and the transmission center frequency should be switched from $f_{r2}$ to $f_{r1}$.

As apparent from the above, the conventional automobile communications system necessitates switching of the oscillation frequencies of the voltage controlled oscillator of an on-board transceiver and a transmission local oscillator for every hand-over operation of changing the radio zones. In particular, accomplishing fast hand-over requires fast frequency switching, which increases the technical burden on an on-board transceiver. This results in an increased cost for the automobile communication system.

SUMMARY OF THE INVENTION

Accordingly, it is an object of the present invention to provide an automobile communications system and method which can ensure fast hand-over without putting unnecessary burden on mobile stations.

It is another object of this invention to provide an automobile communications system and method which can permit continuous communication over a plurality of radio zones without switching the transmission and reception frequencies.

It is a further object of this invention to provide an automobile communications system and method which can maintain communication with an on-board transceiver while adequately handling changes in road condition.

To achieve the above objects, according to one aspect of this invention, there is provided an automobile communication method and system for on-board mobile station in a plurality of radio zones which are consecutively arranged along a road. Each of the radio zones are provided with a plurality of predetermined communication frequencies. A communication frequency used in each of the radio zones is controlled in time division scheme such that simultaneous transmission at a same communication frequency is not permitted in adjoining radio zones and different time slots are allocated for communications at a same communication frequency in adjoining radio zones. A time slot allocated to the on-board mobile station is switched to continuously communicate with the on-board mobile station over the radio zones.

Since time division control is performed to sequentially use a plurality of communication frequencies on a time division basis so that the communication frequencies in use do not overlap each other in adjoining radio zones and to allocate different time slots to communications at the same frequency over adjoining radio zones, the on-board transceiver can keep continuous communication over the radio zones while switching the time slot allocated thereto. For example, the time slot can be switched in such a way that communication over radio zones is always carried out at the same communication frequency. Further, even if all time slots for a certain frequency are occupied, continuous communication can be maintained by switching the communication frequency in use to another frequency.

According to another aspect of this invention, there is provided an automobile communication method between an on-board mobile station and a fixed station system in a plurality of radio zones which are consecutively arranged along a road. Each of the radio zones is provided with a plurality of predetermined communication frequencies. A communication frequency used in each of the radio zones is controlled in time division scheme such that simultaneous transmission at a same communication frequency is not permitted in adjoining radio zones and different time slots are allocated for communications at a same communication frequency in adjoining radio zones. Continuous communication with the on-board mobile station is performed at a same communication frequency over the radio zones.

Since time division control is performed to sequentially use a plurality of communication frequencies on a time division basis so that the communication frequencies in use do not overlap each other over adjoining radio zones and different time slots are allocated to communications at the same frequency in a plurality of communication frequencies over adjoining radio zones, it is possible to accomplish continuous communication with a mobile station over a plurality of radio zones by using the same communication frequency. This can reduce the burden on the hardware on the mobile station side and can accomplish fast hand-over. Further, the burden for fast hand-over can be reduced by a plurality of communication frequencies in each radio zone being in a state of frequency-coherence.

DETAILED DESCRIPTION OF THE PREFERRED EMBODIMENTS

Preferred embodiments of the present invention will now be described with reference to the accompanying drawings.

Figure 1:
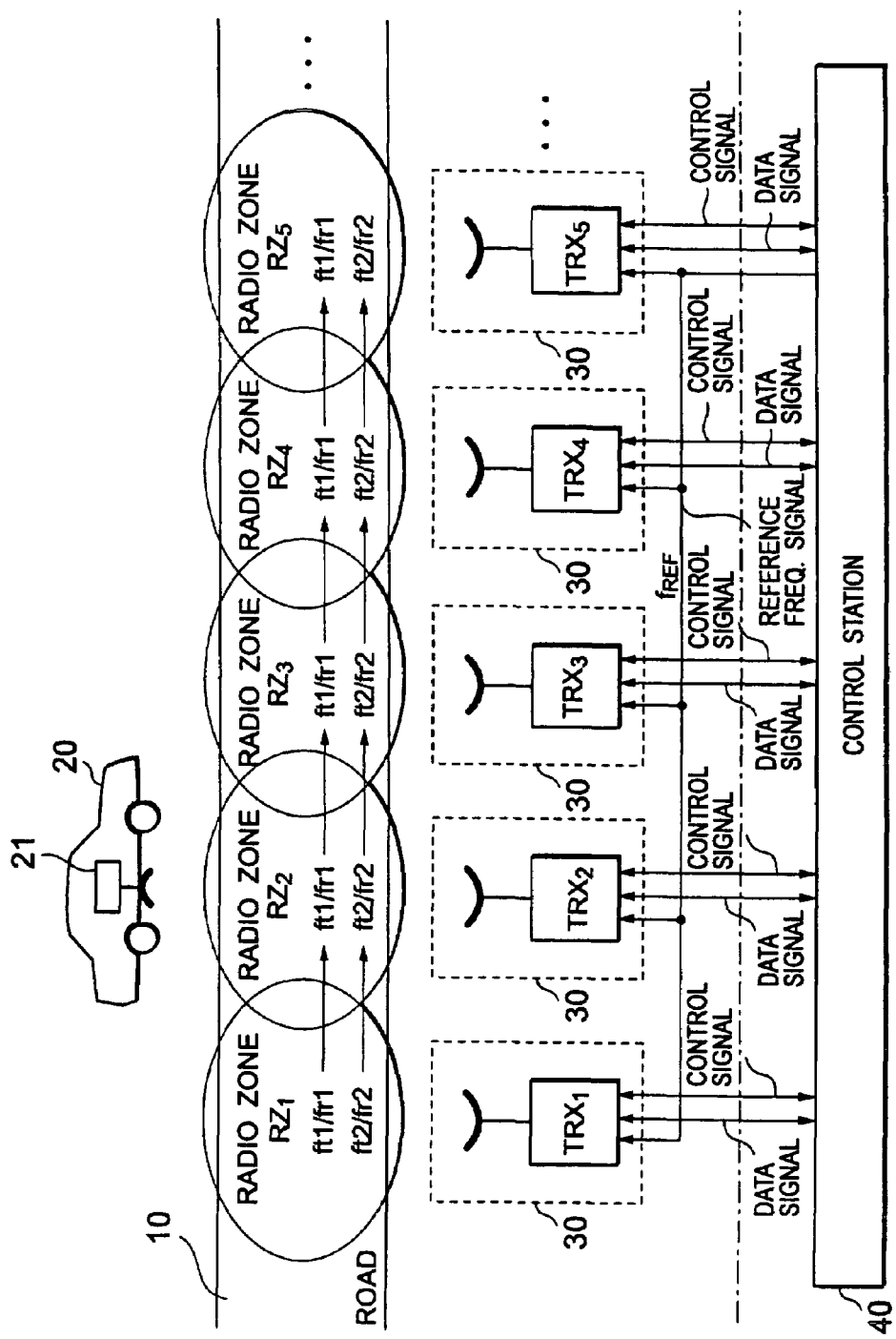
FIG. 1 is a schematic block diagram of an automobile communication system according to a first embodiment of the present invention.

Referring to FIG. 1, it is assumed that a plurality of radio zones $RZ_1$, $RZ_2$, $RZ_3$ and so forth are consecutively arranged on a road 10, each overlapping adjoining radio zones, and a vehicle 20 which runs on this road 10 has an on-board transceiver 21. Each radio zone is produced by its associated roadside communication unit 30, which is controlled by a control station 40. It should be noted that the control station 40 may be a single central station which controls all the roadside communication units 30, or may take the form of a plurality of control stations which perform distributed control on the roadside communication units 30. Alternatively, the control station 40 may be designed in such a manner as to implement hierarchical control on all the roadside communication units 30, which are separated into some groups, with control stations, each controlling its associated group, and a general control station which performs the general control on those control stations.

More specifically, the radio zones $RZ_1$, $RZ_2$, $RZ_3$ and so forth are formed in association with roadside transceivers $TRX_1$, $TRX_2$, $TRX_3$ and so forth, and the control station 40 exchanges data and control signals with the individual roadside transceivers TRX and sends a reference frequency signal $f_{REF}$ to the roadside transceivers TRXs. As will be discussed later, each roadside transceiver TRX generates two transmission reference carrier frequencies ($f_{t1}$, $f_{t2}$) from the reference frequency signal $f_{REF}$ according to a predetermined conversion (n/m conversion in this example), and generates two reception reference frequencies ($f_{r1}$, $f_{r2}$) from the transmission reference carrier frequencies ($f_{t1}$, $f_{t2}$) according to a predetermined conversion (here, $n_r/m_r$ conversion). The predetermined conversion will be discussed later. Each roadside transceiver TRX switches the transmission and reception frequencies of the associated radio zone between $f_{t1}/f_{r1}$ and $f_{t2}/f_{r2}$ in accordance with timing control by the control station 40. The operation of this system will now be explained in more detail.

Figure 2:
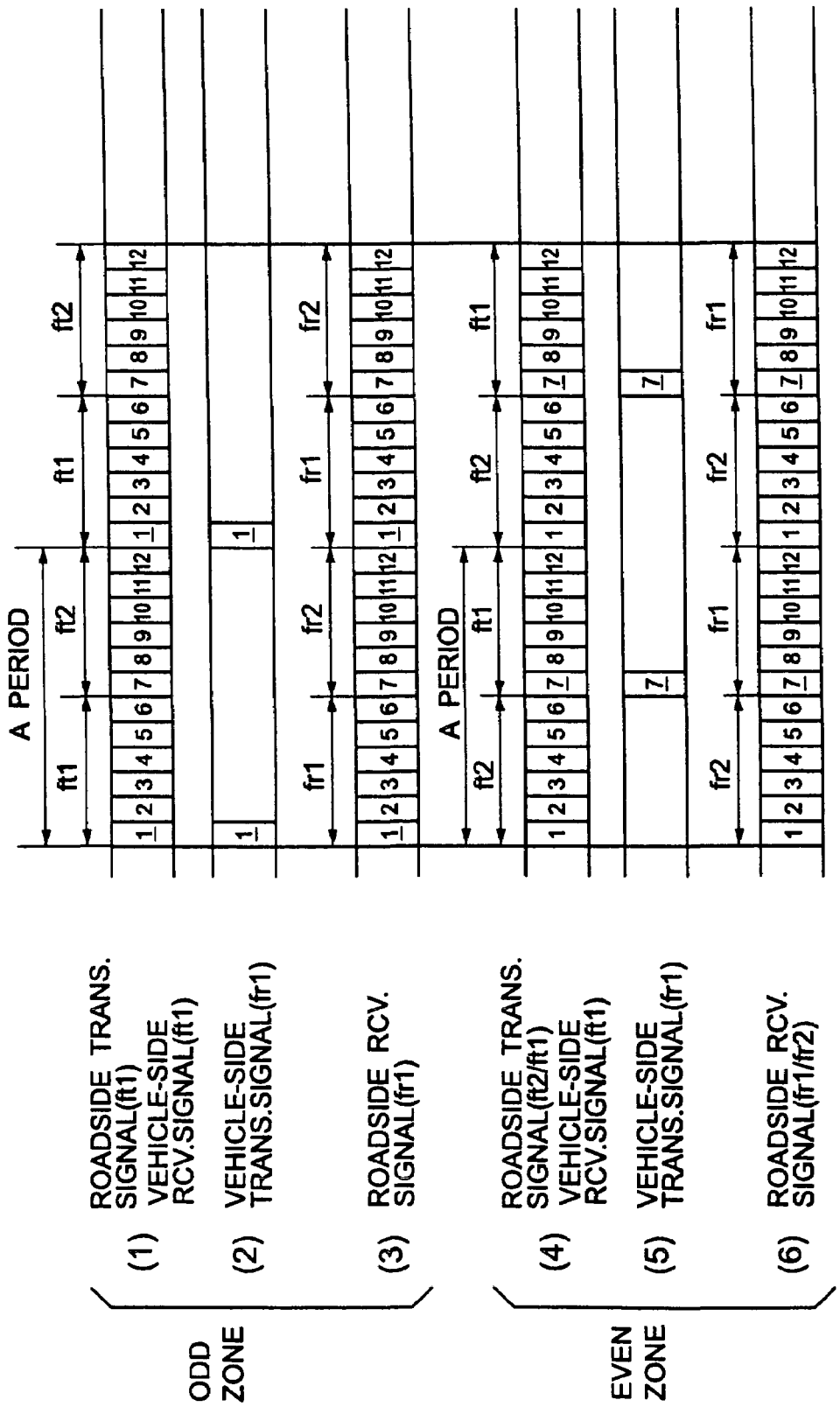
FIG. 2 is a time chart showing a time division format according to the first embodiment.

As shown in FIG. 2, in each radio zone, one period is divided into equal 12 time slots each of which is set to one channel. It is therefore possible to communicate with a maximum of 12 vehicles in a single radio zone.

In each radio zone, the transmission frequency $f_{t1}/f_{t2}$ and the reception frequency $f_{r1}/f_{r2}$ are switched once in a period in such a way as to differ from those of adjoining radio zones. More specifically, as shown in (1) to (3) in FIG. 2, in odd-numbered radio zones $RZ_1$, $RZ_3$, $RZ_5$ and so forth, the transmission frequency is $f_{t1}$ and the reception frequency is $f_{r1}$ in the first half (channels 1 to 6) of one period, but the transmission frequency is switched to $f_{t2}$ and the reception frequency to $f_{r2}$ in the second half (channels 7 to 12). In even-numbered radio zones $RZ_2$, $RZ_4$, $RZ_6$ and so forth, on the other hand, as shown in (4) to (6) in FIG. 2, while the transmission frequency is $f_{t2}$ and the reception frequency is $f_{r2}$ in the first half (channels 1 to 6) of one period, the transmission frequency is switched to $f_{t1}$ and the reception frequency to $f_{r1}$ in the second half (channels 7 to 12). Synchronously switching of the transmission and reception frequencies over all the radio zones this way prevents the transmission and reception frequencies of any radio zone from overlapping those of an adjoining radio zone. Such switching of the transmission and reception frequencies, which will be described specifically (see FIG. 3), is accomplished by switching a selector in synchronism with the channel timing under control of a data processor of a roadside transceiver.

A description will now be given of the channel allocation and transmission and reception operations in a case where the vehicle 20 enters the radio zone $RZ_2$ from the radio zone $RZ_1$. In general, when the vehicle 20 enters a radio zone, one unused channel in the twelve channels is allocated through, for example, a control channel or the like. If every channel is usable, the channel 1 is allocated when the transmission frequency of the radio zone is $f_{t1}$, while the channel 7 is allocated when the transmission frequency of the radio zone is $f_{t2}$. In this example, it is assumed that the transmission and reception frequencies $f_{t1}/f_{r1}$ are used in the radio zone $RZ_1$ and the channel 1 has been allocated to the vehicle 20.

While the vehicle 20 is moving in the radio zone $RZ_1$, a frequency controller in the on-board transceiver 21 controls the oscillation frequency to $f_{t1}$ to do the coherent detection of a radio signal received from the roadside transceiver $TRX_i$ as will be discussed later (see FIG. 4). Further, the oscillation frequency $f_{t1}$ is converted to the frequency $f_{r1}$ by an $n_r/m_r$ converter, thus generating a vehicle-side transmission reference carrier. A modulator modulates the vehicle-side transmission reference carrier according to transmission data, and the radio transmission signal is sent to the roadside transceiver $TRX_1$ as a burst signal at the timing of the channel 1. In this manner, the on-board transceiver 21 and the roadside transceiver $TRX_1$ can communicate with each other over the channel 1 using the transmission and reception frequencies $f_{t1}/f_{r1}$.

When the vehicle 20 enters the even-numbered radio zone $RZ_2$ from the odd radio zone $RZ_1$ in this situation, the opposite party of the on-board transceiver 21 is switched to the roadside transceiver $TRX_2$ from the roadside transceiver $TRX_1$. Specifically, when the vehicle 20 moves into the radio zone $RZ_2$, the roadside transceiver $TRX_2$ allocates to the on-board transceiver 21 the channel that uses the same transmission and reception frequencies $f_{t1}/f_{r1}$ as those of the radio zone $RZ_1$. It is assumed here that the channel 7 has been allocated to the on-board transceiver 21.

The transmission and reception frequencies in use are $f_{t1}/f_{r1}$, the same as those of the radio zone $RZ_1$, wherein the transmission frequency $f_{t1}$ has been generated in any roadside transceiver TRX from the reference frequency signal $f_{REF}$ supplied from the control station 40 according to a predetermined conversion (here, n/m conversion). Therefore, the transmission frequencies are in a frequency-coherence state. The details of frequency coherence will be discussed later.

The local frequency $f_{r1}$ to be given to a demodulator has been produced from the transmission frequency $f_{t1}$ according to a predetermined conversion ($n_r/m_r$ conversion), and a local frequency for transmission (roadside reception frequency) $f_{r1}$ is also produced in the on-board transceiver 21 from the local frequency for demodulation (roadside transmission frequency) $f_{t1}$ using the same predetermined conversion ($n_r/m_r$ conversion). The use of the same predetermined conversion between the roadside transceiver and the on-board transceiver can set the overall system in a frequency-coherence state, so that the demodulators of the roadside transceiver TRX and the on-board transceiver 21 can achieve extremely rapid synchronization acquisition.

The opposite party of the on-board transceiver 21 is quickly switched to the roadside transceiver TRX from the roadside transceiver $TRX_1$ in this manner, and can communicate with the on-board transceiver 21 over the channel 7 in the radio zone $RZ_2$ using the same transmission and reception frequencies $f_{t1}/f_{r1}$. Specifically, assuming that the length of each radio zone along the road 10 is about 100 m and the overlapped length of the adjoining radio zones is about 10 m, the hand-over in a fast running state should be completed in a short period of several tens to several hundred milliseconds. As mentioned earlier, fast hand-over can be accomplished by rendering the entire system in a frequency-coherence state.

Even if the vehicle 20 runs on the road 10 and hand-over is repeated over the consecutive radio zones $RZ_1$, $RZ_2$, $RZ_3$ and so forth, the communication frequencies are always kept at the initial transmission and reception frequencies $f_{t1}/f_{r1}$ and only the communication channel is switched between the channels 1 and 7 every time hand-over takes place. The control station 40 can control switching of the transmission and reception frequencies while the roadside communication unit 30 can control switching of the communication channel of the on-board transceiver 21. Alternatively, the control station 40 can control both switching of the transmission and reception frequencies and switching of the communication channel of the on-board transceiver 21.

Figure 3:
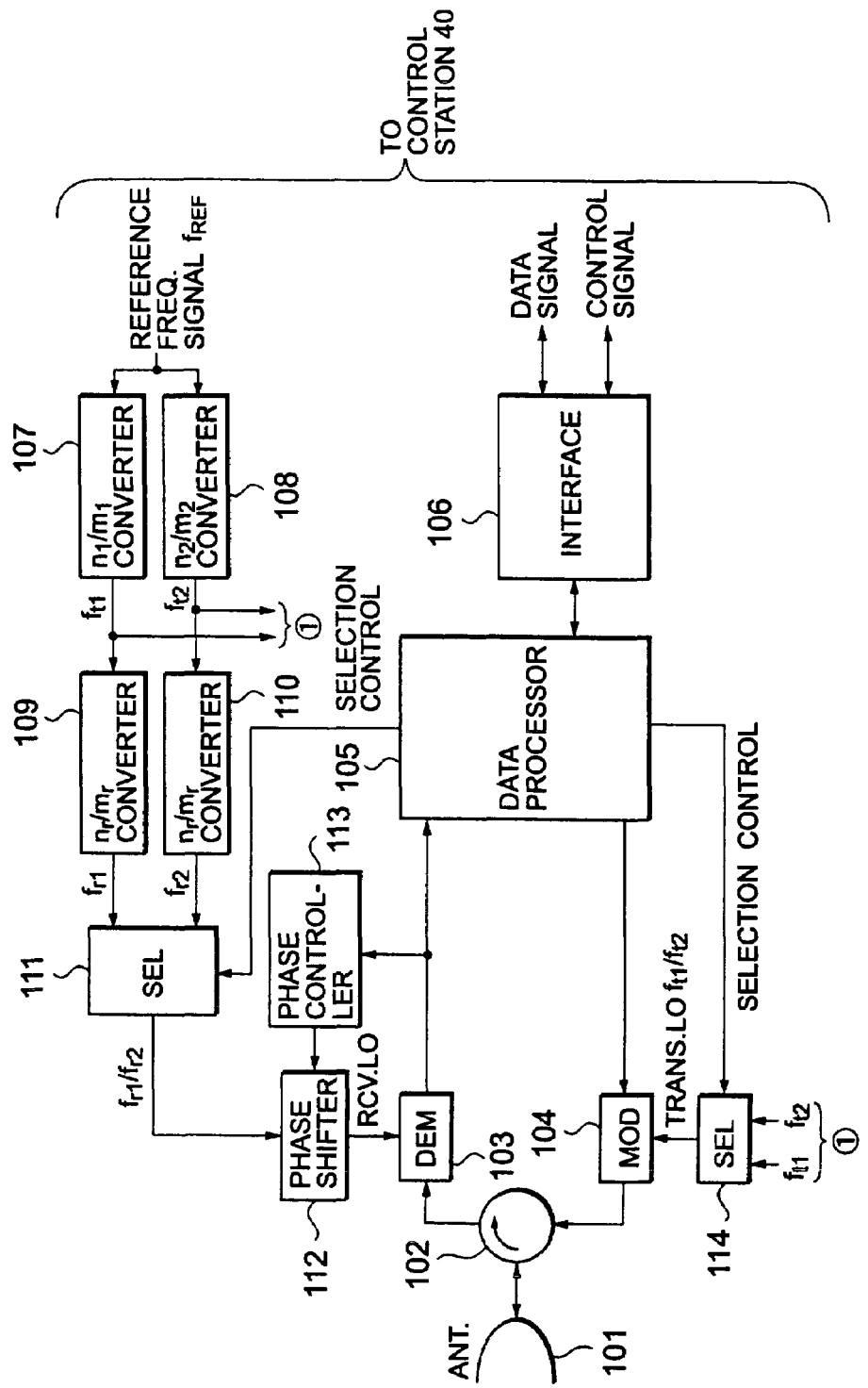
FIG. 3 is a block diagram illustrating the internal circuit structure of a roadside transceiver TRX according to the first embodiment.

FIG. 3 illustrates the internal circuit of the roadside transceiver TRX. An antenna 101 which produces a radio zone is connected via a duplexer 102 to a demodulator and a modulator 104. The demodulator 103 and modulator 104 are connected to a data processor 105, which is connected via an interface circuit 106 to the control station 40. In the case where the control station 40 is connected to the individual roadside transceivers TRX by optical fibers, for example, the interface circuit 106 performs conversion between an optical signal and an electrical signal.

When receiving a data signal to be sent to the transceiver 21 of the vehicle 20 from the control station 40, the data processor 105 of the roadside transceiver TRX extracts a signal to be sent by the roadside transceiver TRX itself, pruduces a transmission baseband signal according to the signal format which has the time slots shown in FIG. 2, and sends the baseband signal to the modulator 104. When receiving a reception baseband signal from the demodulator 103, the data processor 105 converts it into a signal format for transmission to the control station 40, and sends the converted signal via the interface circuit 106 to the control station 40.

The reference frequency signal $f_{REF}$ supplied from the control station 40 is converted by an $n_1/m_1$ converter 107 and an $n_2/m_2$ converter 108 according to predetermined conversions, or it is subjected to $n_1/m_1$ conversion and $n_2/m_2$ conversion, yielding two transmission reference carriers of frequencies $f_{t1}$ and $f_{t2}$. Those transmission reference carriers undergo conversion according to a predetermined conversion or $n_r/m_r$ conversion by $n_r/m_r$ converters 109 and 110, yielding two reception reference signals of frequencies $f_{r1}$ and $f_{r2}$. Here, n, m, $n_r$ and $m_r$ are all integers.

Each of the $n_1/m_1$ converter 107, the $n_2/m_2$ converter 108 and the $n_r/m_r$ converters 109 and 110 is constituted by a phase-locked loop (PLL) circuit, and well-known PLL synthesizers may be used for the converters. In this example, the respective communication frequencies used in this embodiment can be obtained by setting the frequency dividing ratios (n, m) of the PLL synthesizers to $(n_1, m_1)$, $(n_2, m_2)$ and $(n_2, m_r)$.

The reception reference carriers $f_{r1}$ and $f_{r2}$ are sent from the $n_r/m_r$ converters 109 and 110 to a selector 111 which selects one of the reception reference carriers according to a select control signal from the data processor 105. The selected reception reference signal $f_{r1}/f_{r2}$ has its phase adjusted by a phase shifter 112, and is then sent as a reception reference signal to the demodulator 103. The demodulator 103 performs synchronous detection of a radio received signal using the reception reference signal $f_{r1}/f_{r2}$, yielding the reception baseband signal. A phase controller 113 controls the phase shifter 112 based on the output of the demodulator 103 in such a way that the demodulator 103 acquires synchronization, thereby adjusting the phase of the reception reference signal.

The two transmission reference carriers of frequencies $f_{t1}$ and $f_{t2}$ are sent from the $n_1/m_1$ converter 107 and $n_2/m_2$ converter 108 to a selector 114, which selects one of the transmission reference reference carriers according to a select control signal from the data processor 105. The selected transmission reference carrier $f_{t1}/f_{t2}$ is sent to the modulator 104 where it is modulated in accordance with the transmission baseband signal from the data processor 105. The select control signals for operating the selectors 111 and 114 are produced in accordance with control signals from the control station 40.

In every roadside transceiver TRX in this system, as apparent from the above, the reception reference signals $f_{r1}$ and $f_{r2}$ are generated by subjecting the transmission reference carriers $f_{t1}$ and $f_{t2}$ to conversion according to a predetermined conversion or $n_r/m_r$ conversion. Therefore, those generated reception reference signals $f_{r1}$ and $f_{r2}$ are also frequency-coherent between the roadside transceivers TRX. Any modulation scheme may be used in the embodiment. For example, ASK, BPSK and QPSK may appear adequate, which are in no way restrictive.

Figure 4:
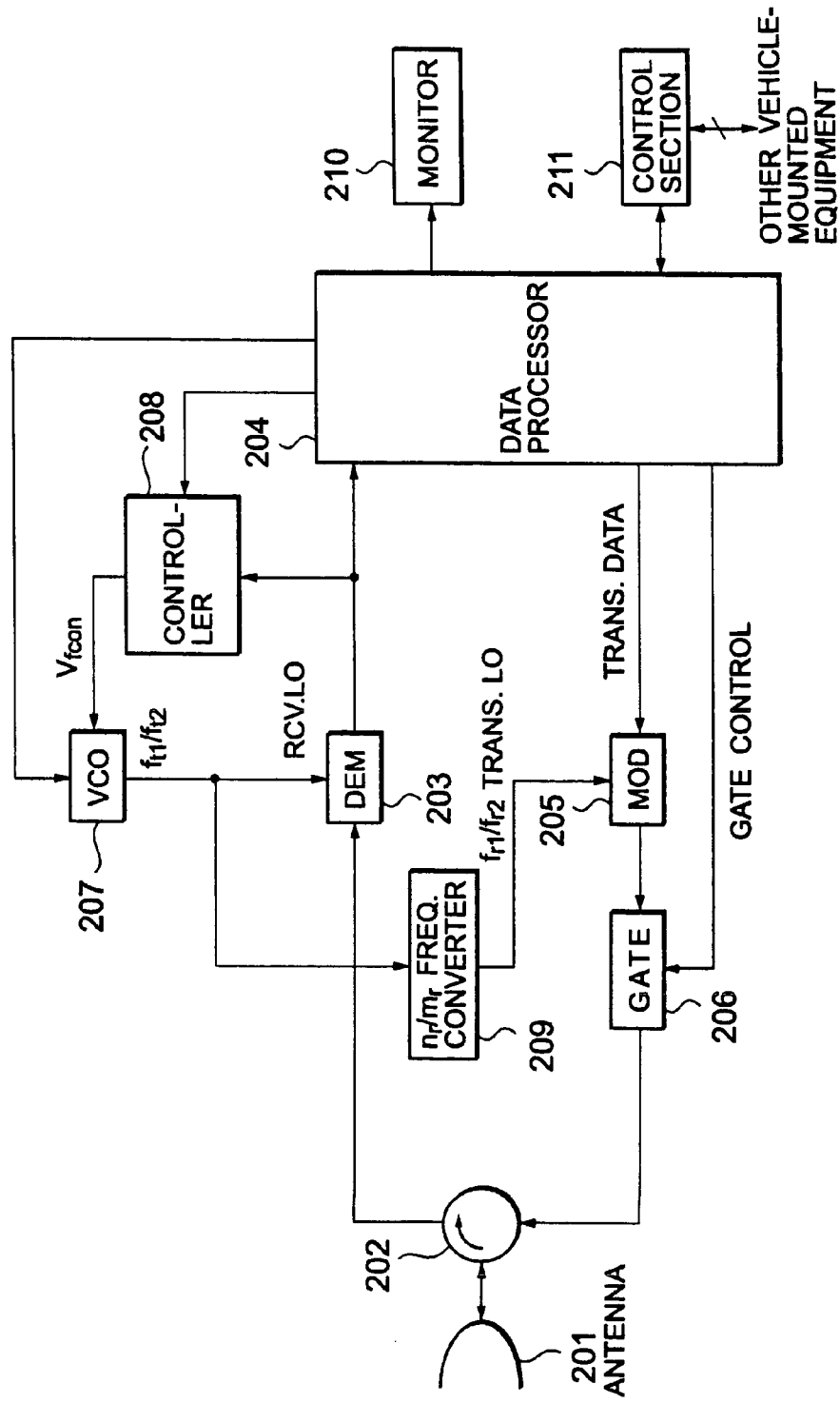
FIG. 4 is a block diagram depicting the internal circuit structure of an on-board transceiver according to the first embodiment.

FIG. 4 depicts the internal circuit of the on-board transceiver. The on-board transceiver 21 communicates with the roadside transceiver TRX via an antenna 201. A radio signal received by the antenna 201 is input to a demodulator 203 via a duplexer 202. The demodulator 203 performs synchronous detection of the received radio signal, and sends the retimed data signal to a data processor 204. On the other hand, a transmission data signal from the data processor 204 is output to a modulator 205, which modulates the transmission reference carrier based on the transmission data signal and sends the resultant signal to a gate circuit 206. The gate circuit 206 is opened or closed by a gate control signal from the data processor 204, generating a burst signal at the timing that matches the signal format as shown in FIG. 2, and sends the burst signal to the duplexer 202.

The regenerated reference carrier which is need for synchronous detection in the demodulator 203 is produced by a voltage controlled oscillator (VCO) 207 and a control section 208. More specifically, the control section 208 receives the received data signal or the output of the demodulator 203, performs a logical operation on the received data signal, and sends a control voltage $V_{FCON}$ to the VCO 207 in such a way that the demodulator 203 acquires synchronization. The VCO 207 regenerates the reception reference carrier of the frequency $f_{r1}/f_{r2}$ which matches the transmission frequency from the roadside transceiver TRX, in accordance with the control voltage $V_{FCON}$ and sends the reception reference carrier to the demodulator 203.

The output of the VCO 207 is subjected to conversion according to the same predetermined conversion as used on the roadside transceiver, i.e., $n_r/m_r$ conversion, yielding the transmission reference carrier of the $f_{r1}/f_{r2}$ which is the same as the reception reference frequency for demodulation in the roadside transceiver TRX. The modulator 205 receives this transmission reference carrier $f_{r1}/f_{r2}$ and modulates it according to transmission data, yielding a radio transmission signal. An $n_r/m_r$ converter 209, like the $n_2/m_2$ converter 108 and the $n_r/m_r$ converters 109 and 110, is constituted by a phase-locked loop (PLL) circuit, and a well-known PLL synthesizer may be used for the converter.

The data processor 204 extracts data assigned to its transceiver from the received data, and performs data processing on the data for display on a monitor 210 or sends necessary information to a control section 211 of the vehicle 20. The control section 211 controls various devices mounted on the vehicle 20 in accordance with the received information.

A response to the received information or detection signals from sensors mounted on the vehicle 20 are sent via the control section 211 to the data processor 204, producing transmission data. Then, a burst signal is produced at the timing of the allocated channel and is sent to the roadside transceiver TRX.

As explained above, while the vehicle 20 is running in the radio zone $RZ_1$, communication is carried out at the transmission and reception frequencies $f_{t1}/f_{r1}$ over the channel 1 under the time division control on the communication frequencies and channels as shown in FIG. 2. When the vehicle 20 enters the radio zone $RZ_2$, communication is carried out at the transmission and reception frequencies $f_{t1}/f_{r1}$ over the channel 7. That is, from the viewpoint of the on-board transceiver 21, communication is performed over the channel 1 while the vehicle 20 is moving in an odd-numbered radio zone and it is performed over the channel 7 while the vehicle 20 is moving in an even-numbered radio zone. In either case, the transmission and reception frequencies in use are the initially set $f_{t1}$ and $f_{r1}$. Although the transmission and reception frequencies $f_{t1}/f_{r1}$ are the same, the time division control is performed to make the transmission and reception frequencies different between adjoining radio zones. It is thus possible to avoid interference of the communication frequencies. With different frequencies, interference can be eliminated by a filter as in the prior art so that no problem would arise.

Again, two transmission frequencies $f_{t1}$ and $f_{t2}$ are used in a time-division manner and are not transmitted simultaneously. Accordingly, the transmission power and its peak signal component are the same as those of the transmission signal in the prior art, so that the performances that are demanded of the transmitter, such as the transmission power and non-linear distortion characteristic at the operational point can be the same as those of the prior art.

As frequency coherence is implemented over adjoining radio zones, the time required for establishing carrier synchronization in the demodulator 203 of the on-board transceiver 21 can be extremely short, resulting in fast synchronization. In other words, since the received signal is frequency-coherent to the regenerated reference carrier, the phase control by the control section 208 is merely needed to acquire synchronization, thus ensuring fast demodulation.

Frequency coherence will be discussed more specifically. To begin with, a plurality of frequency-coherent signals mean signals which are obtained through n/m conversion of one reference frequency signal by a plurality of n/m converters having the same frequency dividing ratio. Even with the use of PLL synthesizers all having the same frequency dividing ratio, frequency division would cause unsettling of phase and would result in an error of several Hz among the actually obtained frequencies. With the error of such a level, however, the demodulator can acquire synchronization very fast by the ordinary phase control or frequency control. Therefore, the aforementioned fast hand-over can be achieved by putting the entire system on the frequency-coherence state.

Figure 5:
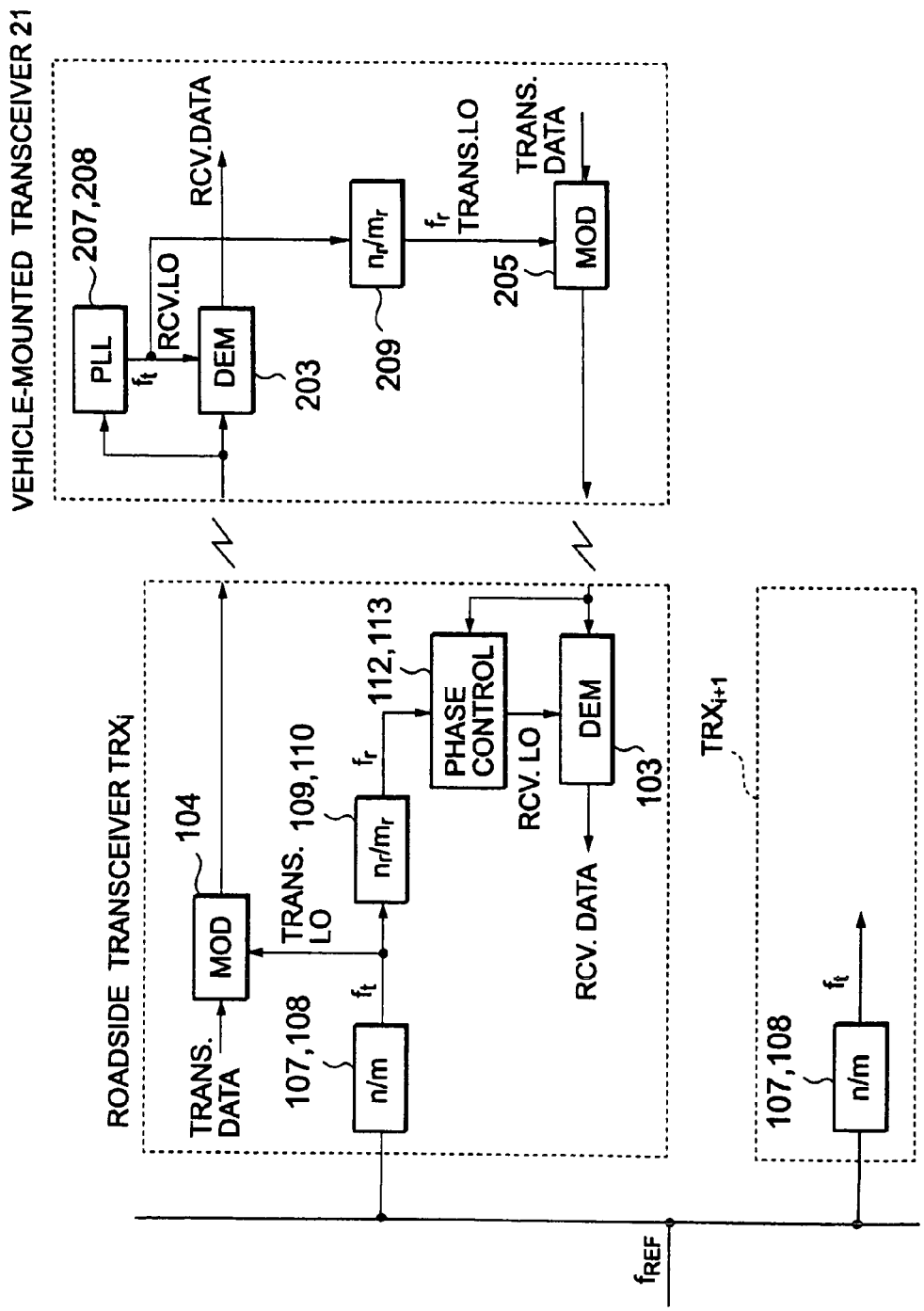
FIG. 5 is a simplified block diagram for explaining frequency coherence of the overall system according to the first embodiment.

Referring to FIG. 5, the transmission reference frequency signals ($f_t$) that are generated in the individual roadside transceivers TRX are what is obtained by the same n/m conversion of the reference frequency $f_{REF}$ supplied from the control station 40. Therefore, those transmission reference frequency signals are frequency-coherent.

In the on-board transceiver 21 which has received a radio signal from the roadside transceiver TRX, the reception reference frequency $f_r$ is regenerated from the received radio signal without frequency division, and is supplied to the demodulator 203. The reception regenerated reference signal (reception LO) is thus phase-locked to the received signal from the roadside transceiver TRX. This reception regenerated reference signal $f_r$ is subjected to $n_r/m_r$ conversion in the $n_r/m_r$ converter 209 which has the same frequency dividing ratio as that of the roadside transceiver TRX, producing transmission reference signal (transmission LO) of the frequency $f_t$.

As seen from the demodulator 103 of the roadside transceiver TRX, therefore, the reference signal for demodulation is a signal of the frequency $f_r$ obtained by $n_r/m_r$ conversion of the transmission reference frequency $f_t$ and the signal received from the on-board transceiver 21 is a signal of the frequency $f_r$ obtained by $n_r/m_r$ conversion of the same reception regeneration reference signal $f_r$. That is, the reference signal (reception LO) for demodulation of the demodulator 103 and the received signal are two signals that have been obtained by $n_r/m_r$ conversion of the signal of the frequency $f_r$, and they are frequency-coherent to each other. It is therefore possible to implement fast demodulation through mere phase control that is carried out by the phase shifter 112 and the phase controller 113.

As apparent from the above, hand-over can be completed quickly by frequency-coherence in the entire system that comprises all the roadside transceivers TRXs and the on-board transceiver 21.

Figure 6:
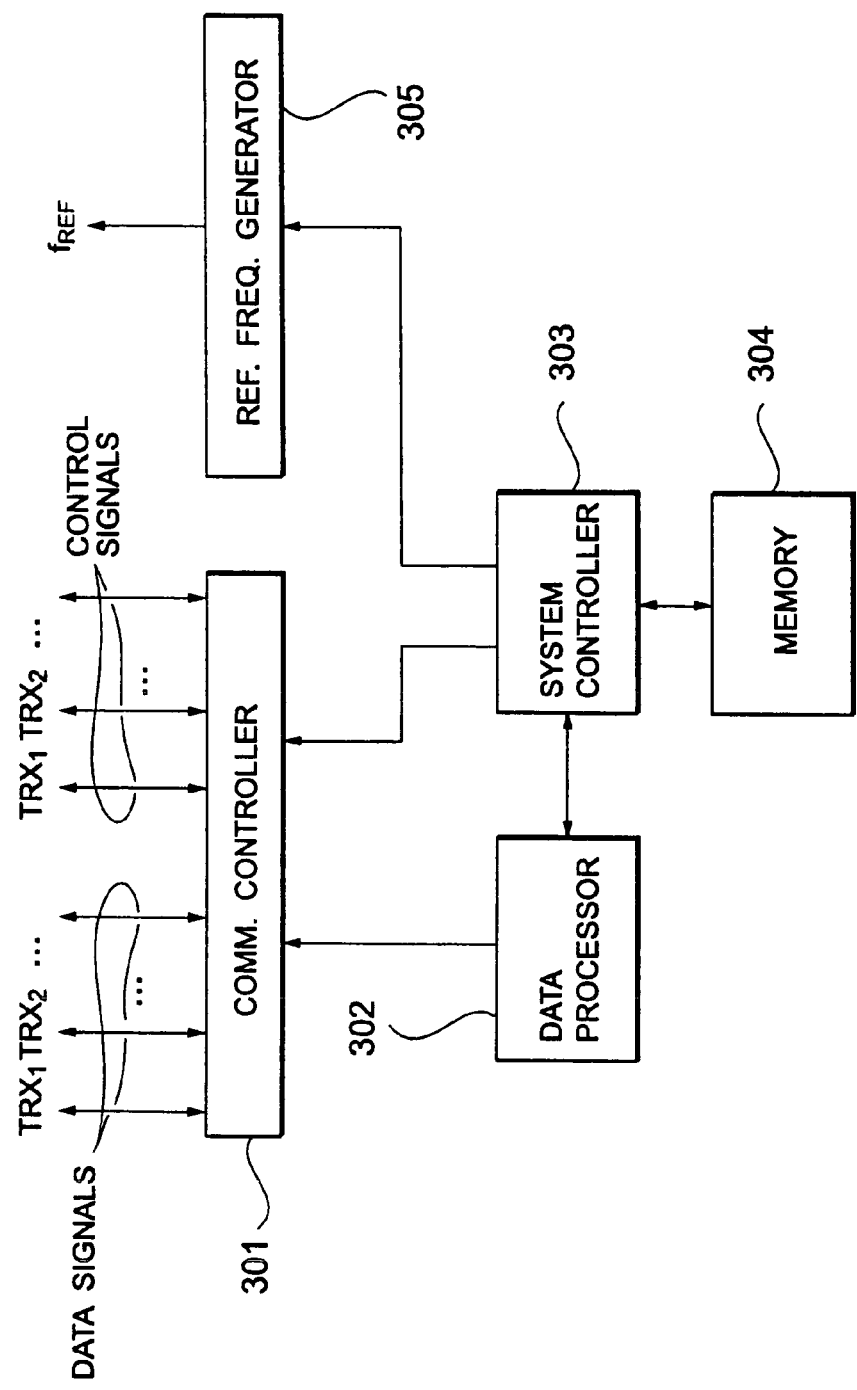
FIG. 6 is a block diagram exemplifying the internal structure of a control station in the system shown in FIG. 1.

FIG. 6 shows an example of the control station in the system shown in FIG. 1. Hereinafter, there will be described a case where the control station performs centralized control on the roadside transceivers TRXs.

The control station 40 is provided with a communication controller 301 in order to exchange data and control signals with the individual roadside communication units 30. In the case where the control station 40 is connected to the individual roadside transceivers TRXs by optical fibers, for example, the communication controller 301 includes an interface which performs conversion between an optical signal and an electrical signal.

Data that is exchanged with the on-board transceiver 21 is processed by a data processor 302, and control signals are processed by a system controller 303. The system controller 303 executes control such as switching of the transmission and reception frequencies of each radio zone as shown in FIG. 2 by, for example, running a system program stored in a memory 304. In place of the roadside communication unit 30, the system controller 303 of the control station 40 may control the aforementioned switching of the communication channel to the on-board transceiver 21. The system controller 303 controls a reference frequency generator 305 to generate the aforementioned reference frequency $f_{REF}$ and supplies the reference frequency $f_{REF}$ to each roadside communication unit 30.

Although the transmission frequency and the reception frequency are separate in the above-described embodiment, transmission and reception can be implemented at the same frequency in a time division manner as will be discussed below. This method is known as TDD (Time Division Duplex).

Figure 7:
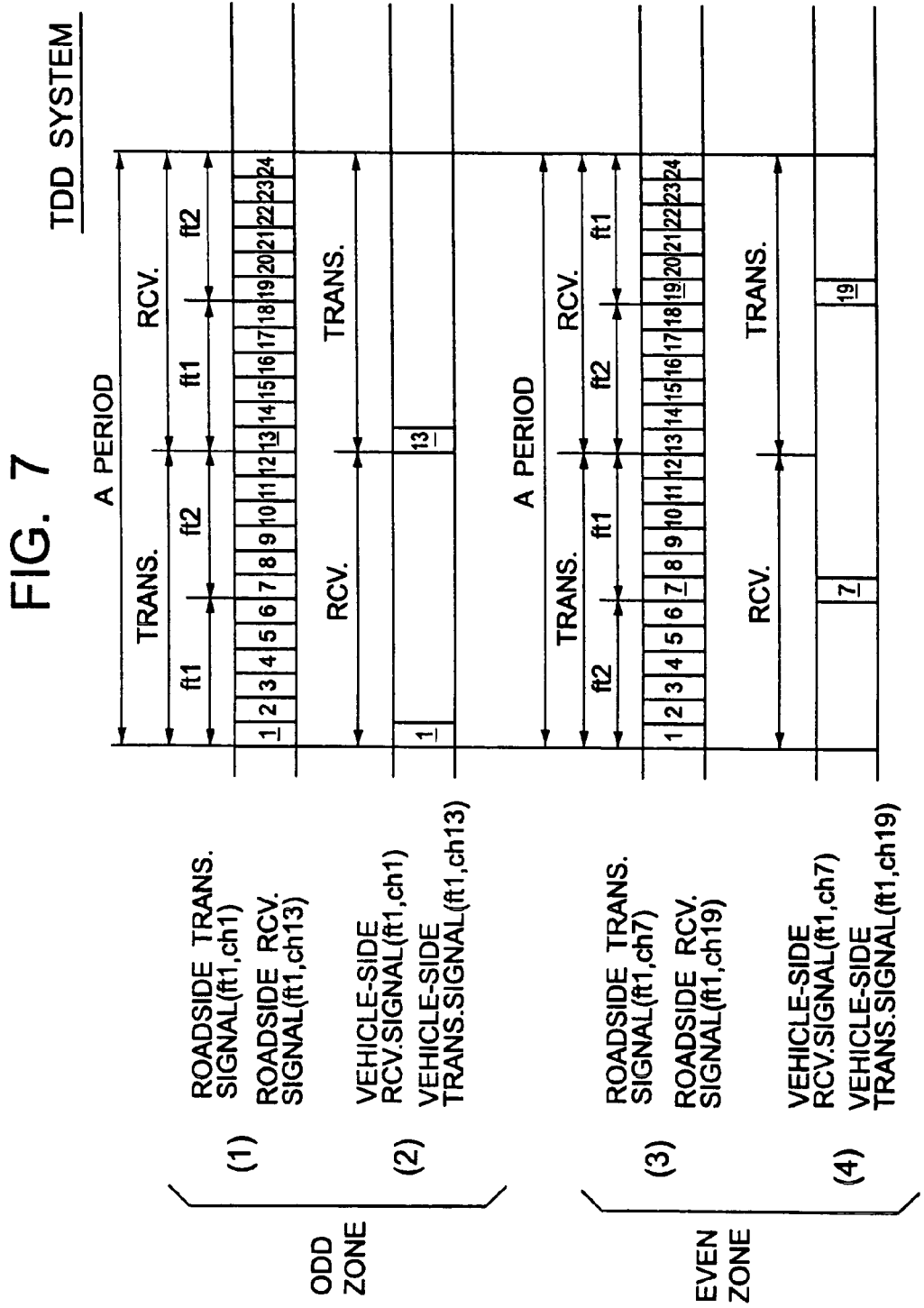
FIG. 7 is a time chart showing the time division format of TDD scheme in an automobile communications system according to a second embodiment of this invention.

FIG. 7 shows a TDD format according to a second embodiment of this invention, wherein (1) and (2) show frequency allocation to odd-numbered radio zones while (3) and (4) show frequency allocation to even-numbered radio zones.

As illustrated in the figure, in each radio zone, one period is divided into equal 24 time slots and the first half channels 1 to 12 are used for roadside transmission (reception on the on-board transceiver side) while the second half channels 13 to 24 are used for roadside reception (transmission on the on-board transceiver side). It is therefore possible to communicate with a maximum of 12 vehicles in a single radio zone. Further, in each radio zone, the communication frequency is switched between $f_{t1}$ and $f_{t2}$ three times in one period in such a way as to avoid overlapping of the communication frequency over adjoining radio zones.

More specifically, in the odd-numbered radio zones $RZ_1$, $RZ_3$, $RZ_5$ and so forth, the communication frequency $f_{t1}$ is used in the first half (channels 1 to 6) of the channels 1 to 12 that are used for roadside transmission (reception on the on-board transceiver side), and the communication frequency is switched to $f_{t2}$ in the second half (channels 7 to 12). Likewise, the communication frequency $f_{t1}$ is used again in the first half (channels 13 to 18) of the channels 13 to 24 that are used for roadside reception (transmission on the on-board transceiver side), and the communication frequency is switched to $f_{t2}$ in the second half (channels 19 to 24).

In even-numbered radio zones $RZ_2$, $RZ_4$, $RZ_6$ and so forth, on the other hand, while the transmission frequency $f_{t2}$ is used in the first half (channels 1 to 6) of the channels 1 to 12 that are used for roadside transmission (reception on the on-board transceiver side), and the transmission frequency is switched to $f_{t1}$ in the second half (channels 7 to 12). Likewise, the communication frequency $f_{t2}$ is used again in the first half (channels 13 to 18) of the channels 13 to 24 that are used for roadside reception (transmission on the on-board transceiver side), and the communication frequency is switched to $f_{t1}$ in the second half (channels 19 to 24). Synchronous switching of the communication frequency over all the radio zones this way prevents the communication frequency of any radio zone from overlapping that of an adjoining radio zone.

A description will now be given of the channel allocation and transmission and reception operations in this embodiment in a case where the vehicle 20 enters the radio zone $RZ_2$ from the radio zone $RZ_1$. Generally, when the vehicle 20 enters a radio zone, two channels in the 24 channels are allocated as transmission and reception channels. If every channel is usable, the channels 1 and 13 are allocated when the communication frequency of the radio zone is $f_{t1}$, while the channels 7 and 19 are allocated when the communication frequency of the radio zone is $f_{t2}$. In this example, it is assumed that the communication frequency $f_{t1}$ is used in the radio zone $RZ_1$ and the channels 1 and 13 have been allocated to the vehicle 20, as shown in (1) and (2) in FIG. 7.

While the vehicle 20 is moving in the radio zone $RZ_1$, the frequency controller in the on-board transceiver 21 sets the oscillation frequency of the VCO to $f_{t1}$ and the demodulator performs synchronous detection of a radio signal from the roadside transceiver $TRX_1$. The data processor inputs the output of the demodulator as reception data on the channel 1. The oscillation frequency $f_{t1}$ of the VCO is used directly as the transmission reference carrier. That is, the modulator modulates the transmission reference carrier with transmission data, and the radio transmission signal is sent to the roadside transceiver $TRX_1$ as a burst signal of the timing of the channel 13. In this manner, the on-board transceiver 21 and the roadside transceiver $TRX_1$ can communicate with each other over the channels 1 and 13 using the communication frequency $f_{t1}$.

When the vehicle 20 enters the even-numbered radio zone $RZ_2$ from the odd-numbered radio zone $RZ_1$ under this circumstance, the opposite party of the on-board transceiver 21 is switched to the roadside transceiver $TRX_2$ from the roadside transceiver $TRX_1$. Specifically, when the vehicle 20 moves into the radio zone $RZ_2$, the roadside transceiver $TRX_2$ allocates two channels that use the same communication frequency $f_{t1}$ as that of the radio zone $RZ_{1p}$ to the on-board transceiver 21. It is assumed here that the channels 7 and 19 have been allocated to the on-board transceiver 21 as shown in (3) and (4) in FIG. 7.

The communication frequency in use is $f_{t1}$, which is the same as that of the radio zone $RZ_1$, and the communication frequency $f_{t1}$ has been generated in any roadside transceiver TRX through $n_1/m_1$ conversion of the reference frequency signal $f_{REF}$ from the control station 40. Therefore, the demodulator of the on-board transceiver 21 can accomplish extremely fast synchronous detection as mentioned above.

That is, synchronous detection can be implemented merely by the control on the VCO by the frequency controller. The on-board transceiver 21 thus communicates with the roadside transceiver $TRX_2$ over the channels 7 and 19 using the communication frequency $f_{r1}$.

Even if the vehicle 20 runs on the road 10 and hand-over is repeated over the consecutive radio zones $RZ_1$, $RZ_2$, $RZ_3$ and so forth, the communication frequency is always kept at the initial transmission/reception frequency $f_{r1}/f_{r1}$ and only the communication channels are switched between the channels 1 and 13 and the channels 7 and 19 every time hand-over takes place. Since the communication frequency is frequency-coherent over the entire system, fast hand-over can be achieved as mentioned earlier.

Figure 8:
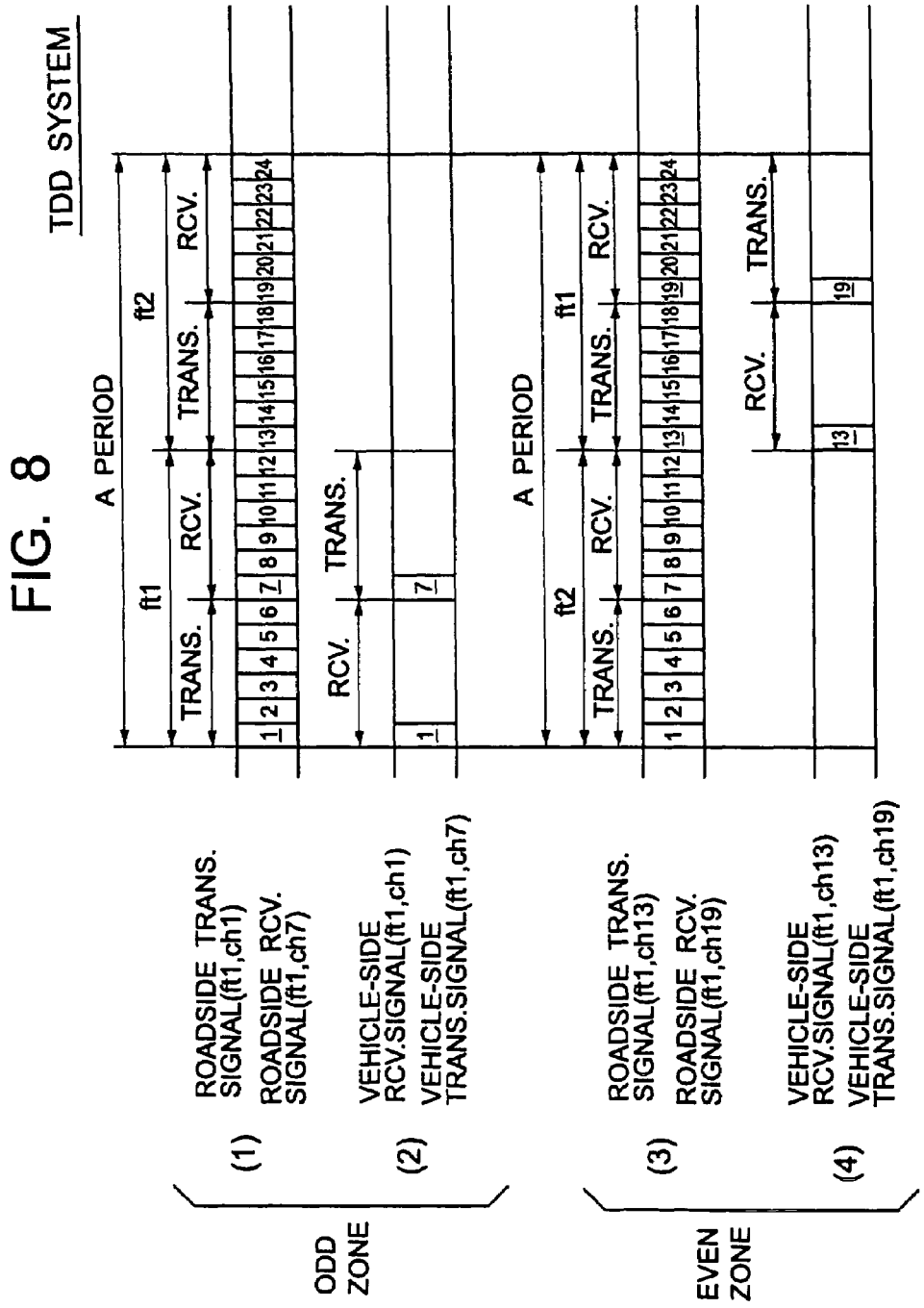
FIG. 8 is a time chart showing the time division format of TDD scheme in an automobile communication system according to a third embodiment of this invention.

FIG. 8 shows a TDD format according to a third embodiment of this invention, wherein (1) and (2) show frequency allocation to odd-numbered radio zones while (3) and (4) show frequency allocation to even-numbered radio zones.

In this embodiment, one period is divided into equal 24 time slots, and in each radio zone, the communication frequency is switched between $f_{r1}$ and $f_{r2}$ once in one period in such a way as to avoid overlapping of the communication frequency over adjoining radio zones. Further, the first half of the period of the same communication frequency is used for the roadside transmission (reception on the on-board transceiver) and the second half of that period is used for the roadside reception (transmission on the on-board transceiver).

More specifically, in the odd-numbered radio zones $RZ_1$, $RZ_3$, $RZ_5$ and so forth, the communication frequency $f_{r1}$ is used in the first half channels 1 to 12 of one period, and the communication frequency is switched to $f_{r2}$ in the second half channels 13 to 24. Further, the first half channels 1 to 6 of the channels 1 to 12 for which the communication frequency $f_{r1}$ is used are used for roadside transmission (reception on the on-board transceiver side), while the second half channels 7 to 12 are used for roadside reception (transmission on the on-board transceiver side). Likewise, the first half channels 13 to 18 of the channels 13 to 24 for which the communication frequency $f_{r2}$ is used are used for roadside transmission (reception on the on-board transceiver side), while the second half channels 19 to 24 are used for roadside reception (transmission on the on-board transceiver side).

In the even-numbered radio zones $RZ_2$, $RZ_4$, $RZ_6$ and so forth, on the other hand, the communication frequency $f_{r2}$ is used in the first half channels 1 to 12 of one period, and the communication frequency is switched to $f_{r1}$ in the second half channels 13 to 24. As in the odd-numbered radio zones, the first half channels 1 to 6 of the channels 1 to 12 for which the communication frequency $f_{r2}$ is used are used for roadside transmission (reception on the on-board transceiver side), while the second half channels 7 to 12 are used for roadside reception (transmission on the on-board transceiver side). Likewise, the first half channels 13 to 18 of the channels 13 to 24 for which the communication frequency $f_{r1}$ is used are used for roadside transmission (reception on the on-board transceiver side), while the second half channels 19 to 24 are used for roadside reception (transmission on the on-board transceiver side). Synchronous switching of the communication frequency over all the radio zones this way prevents the communication frequency of any radio zone from overlapping that of an adjoining radio zone.

A description will now be given of the channel allocation and transmission and reception operations in this embodiment in a case where the vehicle 20 enters the radio zone $RZ_2$ from the radio zone $RZ_1$. Generally, when the vehicle 20 enters a radio zone, two channels in the 24 channels are allocated as transmission and reception channels. If every channel is usable, the channels 1 and 7 are allocated when the communication frequency of the radio zone is $f_{r1}$, while the channels 13 and 19 are allocated when the communication frequency of the radio zone is $f_{r2}$. In this example, it is assumed that the communication frequency $f_{r1}$ is used in the radio zone $RZ_1$ and the channels 1 and 7 have been allocated to the vehicle 20, as shown in (1) and (2) in FIG. 8.

While the vehicle 20 is moving in the radio zone $RZ_1$, the frequency controller in the on-board transceiver 21 sets the oscillation frequency of the VCO to $f_{r1}$ and the demodulator performs synchronous detection of a radio signal from the roadside transceiver $TRX_1$. The data processor inputs the output of the demodulator as reception data on the channel 1. The oscillation frequency $f_{r1}$ of the VCO is used directly as the transmission reference carrier. That is, the modulator modulates the transmission reference carrier with transmission data, and the radio transmission signal is sent to the roadside transceiver $TRX_1$ as a burst signal of the timing of the channel 7. In this manner, the on-board transceiver 21 and the roadside transceiver $TRX_1$ can communicate with each other over the channels 1 and 7 using the communication frequency $f_{r1}$.

When the vehicle 20 enters the even-numbered radio zone $RZ_2$ from the odd-numbered radio zone $RZ_1$ under this circumstance, the opposite party of the on-board transceiver 21 is switched to the roadside transceiver $TRX_2$ from the roadside transceiver $TRX_1$. Specifically, when the vehicle 20 moves into the radio zone $RZ_2$, the roadside transceiver $TRX_2$ allocates two channel that use the same communication frequency $f_{r1}$ as that of the radio zone $RZ_{1p}$ to the on-board transceiver 21. It is assumed here that the channels 13 and 19 have been allocated to the on-board transceiver 21 as shown in (3) and (4) in FIG. 8.

The communication frequency in use is $f_{r1}$, which is the same as that of the radio zone $RZ_1$, and the communication frequency $f_{r1}$ has been generated in any roadside transceiver TRX through $n_1/m_1$ conversion of the reference frequency signal $f_{REF}$ from the control station 40. Therefore, the demodulator of the on-board transceiver 21 can accomplish extremely fast synchronization acquisition as mentioned above. That is, synchronous detection can be implemented merely by the control on the VCO by the frequency controller. The on-board transceiver 21 thus communicates with the roadside transceiver $TRX_2$ over the channels 13 and 19 using the communication frequency $f_{r1}$.

Even if the vehicle 20 runs on the road 10 and hand-over is repeated over the consecutive radio zones $RZ_1$, $RZ_2$ $RZ_3$ and so forth, the communication frequency is always kept at the initial transmission/reception frequency $f_{r1}/f_{r1}$ and only the communication channels are switched between the channels 1 and 7 and the channels 13 and 19 every time hand-over takes place. Since the communication frequency is frequency-coherent over the entire system, fast hand-over can be achieved as mentioned earlier.

Figure 9:
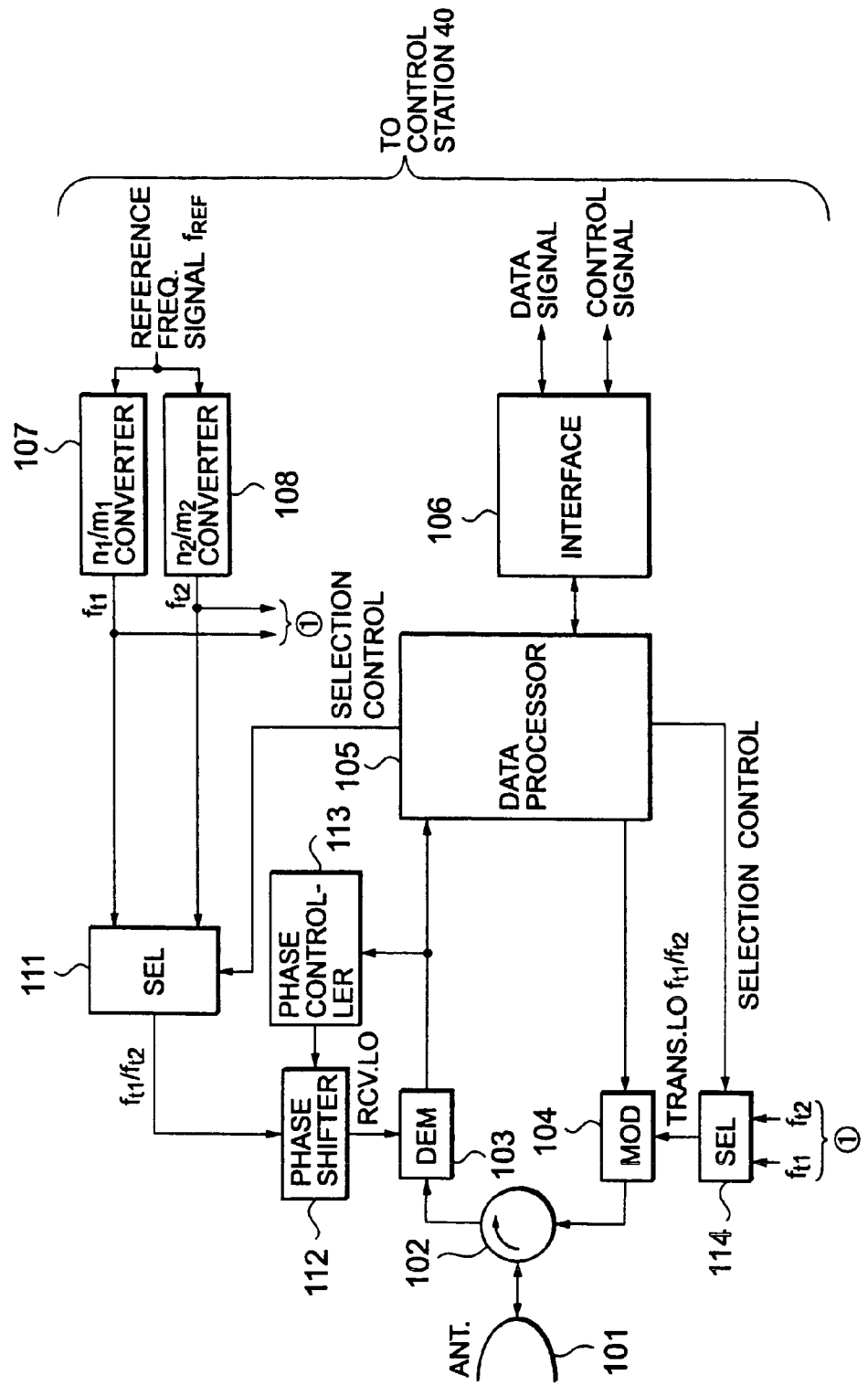
FIG. 9 is a block diagram illustrating the internal circuit structure of a roadside transceiver TRX according to the second and third embodiments based on the TDD system.

FIG. 9 illustrates the internal circuit of a TDD-type roadside transceiver according to the second and third embodiments. To avoid the redundant description, similar or same reference numerals are given to those circuit blocks in FIG. 9, which are the same as the corresponding circuits shown in FIG. 3. Since the TDD type roadside transceiver uses only the communication frequencies $f_{r1}$ and $f_{r2}$ as mentioned earlier, the $n_r/m_r$ converters 109 and 110 in FIG. 3 are unnecessary. Thus, the selector 111 selects either the communication frequency $f_{r1}$ or $f_{r2}$ and supplies the selected communication frequency to the demodulator 103 via the phase shifter 112. The data processor 105 has a TDMA/TDD channel control capability, and controls the selectors 111 and 114 according to the timing illustrated in FIG. 6 or FIG. 7. Further, a gate circuit 115 which is used to produce a transmission burst signal may be controlled by the data processor 105. The other structure and operation are the same as those of the roadside transceiver shown in FIG. 3.

Figure 10:
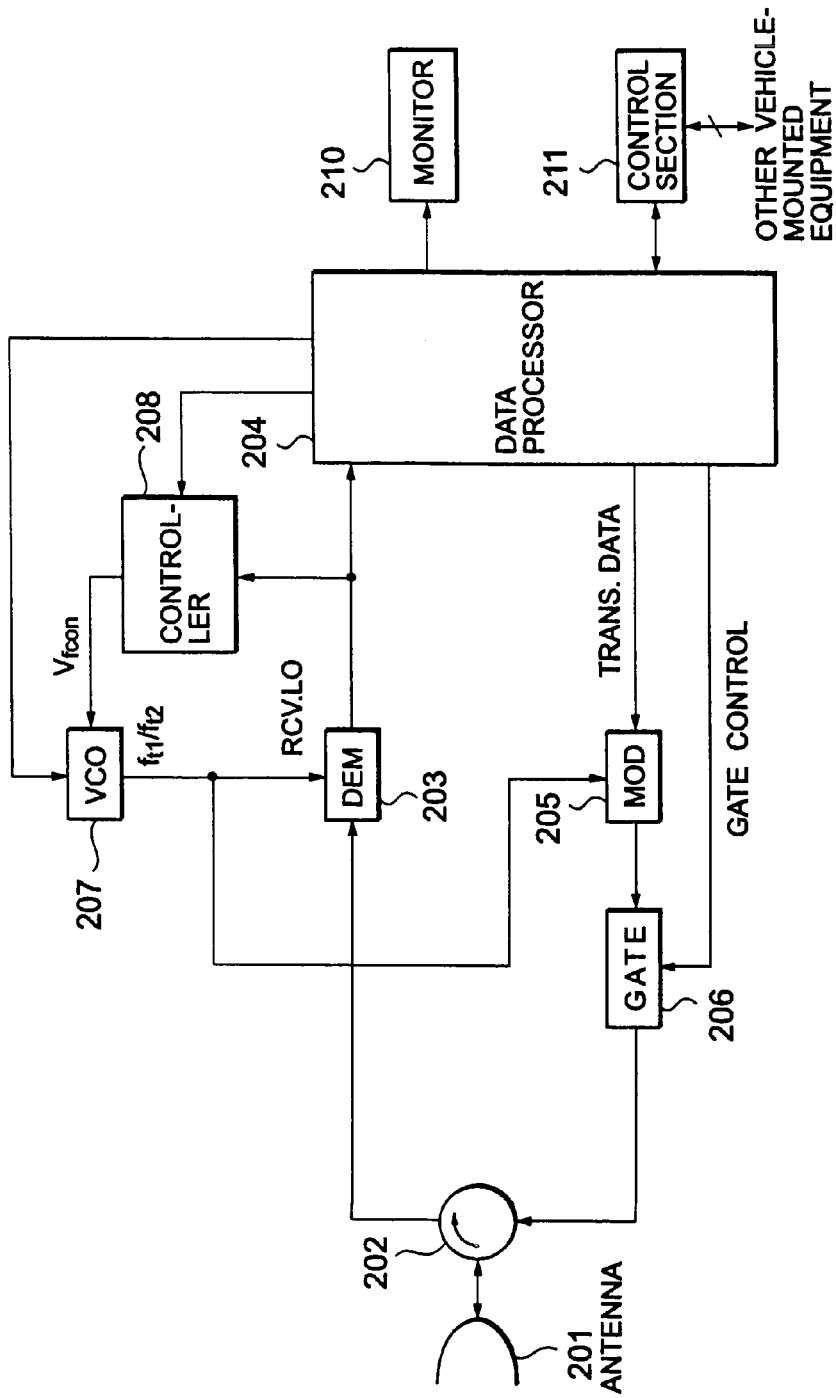
FIG. 10 is a block diagram illustrating the internal circuit structure of an on-board transceiver according to the second and third embodiments based on the TDD system.

FIG. 10 illustrates the internal circuit of a TDD type on-board transceiver according to the second and third embodiments. To avoid the redundant description, similar or same reference numerals are given to those blocks in this figure which are the same as the corresponding circuits shown in FIG. 4. Because the TDD type on-board transceiver uses only the communication frequencies $f_{t1}$ and $f_{t2}$ as mentioned earlier, the $n_r/m_r$ converter 209 in FIG. 4 becomes unnecessary. Thus, the reception reference frequency $f_{r1}/f_{r2}$ that has been regenerated by the VCO 207 is used directly as the transmission reference frequency of the modulator 205. The other structure and operation are the same as those of the on-board transceiver shown in FIG. 4.

Although the first embodiment has been described with reference to a case of using two transmission frequencies and two reception frequencies and the second and third embodiments have been discussed with reference to a case of using two communication frequencies, the number of frequencies in use can be increased when intense radio interference occurs due to the geographic conditions. With three communication frequencies in use, for example, four channels are to be allocated per frequency. In this case, transmission at the same frequency and in the same time slot does not take place over the consecutive three radio zones.

Figure 11:
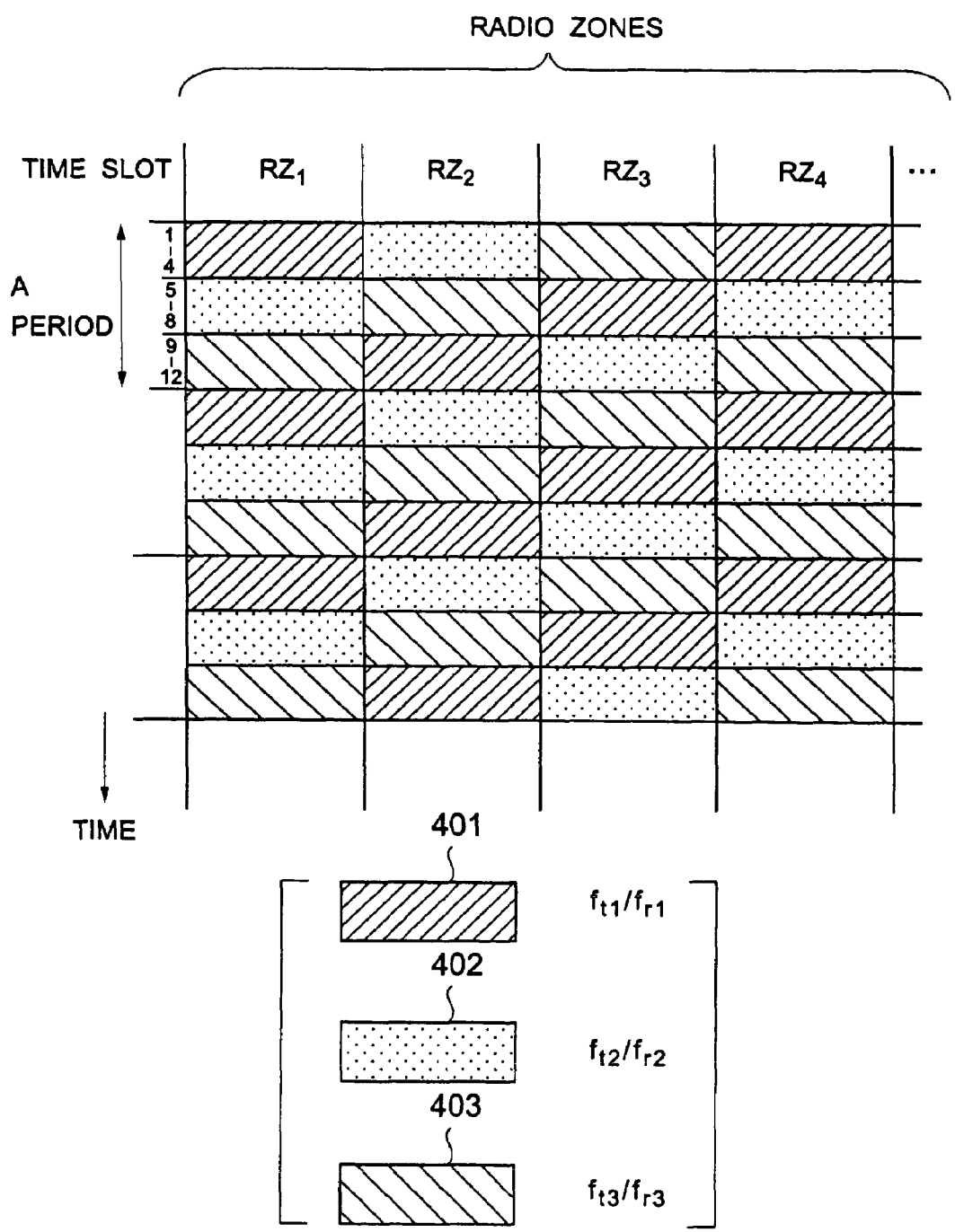
FIG. 11 is a time chart showing how time division switching of 3-wave frequencies is carried out by an automobile communication method according to a fourth embodiment of this invention.

FIG. 11 shows how time division switching of three frequencies is carried out according to a fourth embodiment of this invention. In FIG. 11, the distance along the road 10 is represented by the horizontal axis thereof and the time is represented by the vertical axis. Thus, the radio zones $RZ_1$, $RZ_2$, $RZ_3$ and so forth are arranged along the horizontal axis, and the time slots or channels are periodically arranged on the vertical axis.

As shown in FIG. 11, in each radio zone, the transmission and reception frequencies are switched twice in one period in a predetermined order. Specifically, the transmission frequencies $f_{t1}/f_{t2}/f_{t3}$ and the reception frequencies $f_{r1}/f_{r2}/f_{r3}$ in each radio zone are sequentially switched from one to another so that they differ from the frequencies in an adjoining radio zone. In the (3n+1)-th radio zones $RZ_1$, $RZ_4$, $RZ_7$ and so forth, as shown in FIG. 11, the transmission and reception frequencies $f_{t1}/f_{r1}$ are used over the channels 1 to 4, the transmission and reception frequencies $f_{t2}/f_{r2}$ are used over the channels 5 to 8, and the transmission and reception frequencies $f_{t3}/f_{r3}$ are used over the channels 9 to 12 (where n is an integer equal to or greater than 0). In the (3n+2)-th radio zones $RZ_2$, $RZ_5$, $RZ_8$ and so forth, the transmission and reception frequencies $f_{t2}/f_{r2}$ are used over the channels 1 to 4, the transmission and reception frequencies $f_{t3}/f_{r3}$ are used over the channels 5 to 8, and the transmission and reception frequencies $f_{t1}/f_{r1}$ are used over the channels 9 to 12. In the (3n+3)-th radio zones $RZ_3$, $RZ_6$, $RZ_9$ and so forth, the transmission and reception frequencies $f_{t3}/f_{r3}$ are used over the channels 1 to 4, the transmission and reception frequencies $f_{t1}/f_{r1}$ are used over the channels 5 to 8, and the transmission and reception frequencies $f_{t2}/f_{r2}$ are used over the channels 9 to 12. Synchronous switching of the transmission and reception frequencies over all the radio zones this way prevents the communication frequencies of any radio zone from overlapping those of an adjoining radio zone.

The number of channels per period and allocation of channels to the communication frequencies in each radio zone are in no way limited to those of the above-described fourth embodiment. Any channel quantity and channel allocation are possible as long as conditions for allocating different time slots to adjoining radio zones with respect to the same frequency are satisfied.

The fourth embodiment is similar to the first embodiment in that the transmission frequencies $f_{t1}/f_{t2}/f_{t3}$ are generated from the reference frequency signal $f_{REF}$ given from the control station 40 according to a predetermined conversion (n/m conversion) and the reception frequencies $f_{r1}/f_{r2}/f_{r3}$ are generated from those transmission frequencies according to a predetermined conversion ($n_r/m_r$ conversion) and those frequencies are in the frequency-coherence state.

The present invention is not restricted to the above-described embodiments. Although the foregoing description of those embodiments has been given with reference to a case where the vehicle 20 runs fast on the road 10, the vehicle may move slowly or may be stopped on the road depending on the traffic conditions. The number of vehicles tends to increase in a radio zone at a point where roads merge, whereas that number tends to decrease at a point where a road branches. Therefore, the number of vehicles that are covered by a certain communication frequency in a certain radio zone may always vary. There is a possibility that a communication request may further be made by hand-over at the frequency for which no channel allocation is available. The present invention can flexibly cope with such a case by allocating channels for another frequency.

This will be discussed more specifically, taking the system of the first embodiment shown in FIG. 2 as an example. Suppose that the on-board transceiver 21 has been communicating over the channel 1 of the frequency $f_{t1}$ in an odd-numbered radio zone and has entered an even-numbered radio zone. In this case, the channel 7 of the same frequency $f_{t1}$ of the even-numbered radio zone should be allocated as described above, but if the channels 7 to 12 of the frequency $f_{t1}$ of the even-numbered radio zone are already used, channels of another frequency $f_{t2}$ can be allocated.

When the frequency is changed at the time of hand-over, frequency switching is carried out by the VCO 207, the control section 208 and the demodulator 203 of the on-board transceiver 21. With the vehicle 20 moving slowly, however, such fast frequency switching is not needed so that no problem would arise.

In the above-described embodiments, each roadside communication unit 30 converts the reference frequency signal $f_{REF}$ according to a predetermined conversion (n/m conversion) to achieve the frequency coherence of the transmission frequencies over the radio zones. This conversion is not restrictive, and complete frequency coherence over the radio zones can be achieved by generating the transmission and reception frequencies $f_{t1}$ and $f_{t2}$ through conversion (e.g., multiplication) which does not include frequency division of the reference frequency signal $f_{REF}$ from the control station 40. It is to be noted however that as the reception frequencies $f_{r1}$ and $f_{r2}$ have undergone $n_r/m_r$ conversion, they are in the frequency coherence state over the radio zones.

In particular, as the TDD systems shown in FIGS. 7 and 8 execute transmission and reception at the communication frequencies $f_{t1}/f_{t2}$, complete frequency coherence over the entire system can be achieved by generating the communication frequencies $f_{t1}$ and $f_{t2}$ through conversion (e.g., multiplication) which does not include frequency division of the reference frequency signal $f_{REF}$ from the control station 40 or a phase locking circuit which involves no frequency division. For example, the $n_1/m_1$ converter 107 and the $n_2/m_2$ converter 108 in the roadside communication unit shown in FIG. 9 have only to be replaced with multipliers of different multiplying factors.

As described above, since time division control is performed to sequentially use a plurality of communication frequencies on a time division basis so that the communication frequencies in use do not overlap each other over adjoining radio zones, and communication at the same frequency in a plurality of predetermined communication frequencies over adjoining radio zones is allocated to different time slots, an on-board mobile station can keep continuous communication over radio zones by switching the time slots from one to another. For example, the time slots can be switched in such a way that communication over radio zones is always carried out at the same communication frequency. Further, even if every time slot for a certain frequency is used, continuous communication can be maintained by switching the time slots to those for another frequency.

Since continuous communication with a mobile unit over a plurality of radio zones can be ensured by using the same communication frequency, the burden on the hardware of the mobile unit can be reduced and what is more, fast hand-over can be accomplished.

Further, the burden for fast hand-over can be reduced by frequency coherence of a plurality of communication frequencies in each radio zone.

Although only four embodiments of the present invention have been described herein, it should be apparent to those skilled in the art that the present invention may be embodied in many other specific forms without departing from the spirit or scope of the invention. Therefore, the present embodiments and examples are to be considered as illustrative and not restrictive and the invention is not to be limited to the details given herein, but may be modified within the scope of the appended claims.

The invention claimed is:

1. An automobile communications method for an on-board mobile station across a plurality of radio zones which are consecutively arranged along a road, comprising:
   providing each of the radio zones with a plurality of M communication frequencies;
   providing N plurality of time slots in one period in each of said radio zones;
   switching between said M communication frequencies within each of the radio zones using a time division scheme such that a different one of said N time slots is allocated for adjacent radio zones for each of said plurality of M communication frequencies by sequentially switching from one to another at a time of every N/M time slot; and
   switching a time slot allocated to the on-board mobile station to continuously communicate with the on-board mobile station across the plurality of radio zones, wherein communication between the plurality of radio zones and the on-board mobile station is made using a single one of said M communication frequencies within at least a single radio zone.

2. The automobile communications method of claim 1, wherein the time slot used for communication with the on-board mobile station is switched in such a manner that communication with the on-board mobile station is continuously performed at one of said plurality of M communication frequencies over the plurality of radio zones.

3. The automobile communication method according to claim 1, wherein the time slot is switched in such a manner that communication with the on-board mobile station is continuously performed at different communication frequencies over the radio zones.

4. The method of claim 1, wherein the plurality of M communication frequencies in each radio zone are generated from a single reference frequency.

5. The method of claim 1, wherein the time division scheme is such that each time slot for each radio zone uses a different one of said plurality of M communication frequencies.

6. An automobile communications method between an on-board mobile station and a fixed station system comprising a plurality of radio zones consecutively arranged along a road, comprising:
   providing each of the radio zones with a plurality of M communication frequencies;
   providing a plurality of N time slots in one period in each of said radio zones;
   switching between said plurality of M communication frequencies within each of the radio zones using a time division scheme such that a different one of said N time slots is allocated for each adjacent radio zone for each of said plurality of M communication frequencies by sequentially switching from one to another at a timing of every N/M time slot; and
   continuously communicating with the on-board mobile station at one of said plurality of communication frequencies over the plurality of radio zones, wherein communication between said plurality of radio zones and said on-board mobile station is made using a single frequency.

7. The automobile communications method of claim 6, wherein the M plurality of communication frequencies in each radio zone are generated from a single reference frequency in accordance with a predetermined conversion to be in a frequency-coherence state.

8. The automobile communications method of claim 6, wherein each of said plurality of M communication frequencies is used for both transmission and reception to perform communication with the on-board mobile station according to a TDMA/TDD (Time Division Multiple Access/Time Division Duplex) scheme.

9. The automobile communications method of claim 6, wherein the plurality of M communication frequencies in each radio zone are generated from a single reference frequency in accordance with a predetermined conversion to be in a frequency-coherence state, wherein each of the plurality of M communication frequencies is used for both transmission and reception to perform communication with the on-board mobile station according to a TDMA/TDD (Time Division Multiple Access/Time Division Duplex) scheme.

10. The method of claim 6, wherein the plurality of M communication frequencies in each radio zone are generated from a single reference frequency.

11. The method of claim 6, wherein the time division scheme is such that each time slot for each radio zone uses a different one of said plurality of M communication frequencies.

12. The automobile communications method of claim 6, wherein one time slot is assigned to a single on-board mobile station.

13. The automobile communications method of claim 12, wherein the time slot allocated to the on-board mobile station is switched in such a way that the on-board mobile station uses one of said plurality of M communication frequencies over the plurality of radio zones.

14. The automobile communications method of claim 6, wherein the plurality of M communication frequencies comprises a plurality of different pairs of first frequencies and second frequencies, wherein the first frequencies are generated from one reference frequency in accordance with first predetermined conversion so that the first frequencies are in a frequency-coherence state over the radio zones.

15. The automobile communication method according to claim 14, wherein the on-board mobile station generates a transmission local signal of the second frequency from a radio signal received from the fixed station system in accordance with a second predetermined conversion.

16. The automobile communication method according to claim 15, wherein the fixed station system generates a reception local frequency from the first frequency in accordance with the second predetermined conversion as used by the on-board mobile station so that the reception local frequency and a radio signal received from the on-board mobile station are in a frequency-coherence state.

17. An automobile communications system comprising:
an on-board mobile station movable on a road;
a plurality of fixed stations comprising a plurality of radio zones consecutively arranged on the road, wherein each of the plurality of fixed stations are communicable with the on-board mobile station using a plurality of M communication frequencies; and
a control station providing plurality of N time slots in one period in each of the radio zones, controlling the plurality of fixed stations performing continuous communication with the on-board mobile station by switching said N time slots in adjoining radio zones with said on-board mobile station using one of said plurality of M communication frequencies in adjoining radio zones, switching one of said N time slots allocated to the on-board mobile station in accordance with the switching in said plurality of fixed stations and by switching between said plurality of M communication frequencies in each of the plurality of radio zones using a time division scheme such that adjoining fixed stations communicate with a plurality of on-board mobile stations using different frequencies of said plurality of M communications frequency at any given time, and sequentially switching said plurality of M communication frequencies from one to another at a timing of every N/M time slots, wherein communication between said plurality of fixed stations and said on-board mobile station is made using a single frequency.

18. The automobile communications system of claim 17, wherein the one of said N time slots allocated to the on-board mobile station is switched from one to another in such a manner that communication with the on-board mobile station is continuously performed at said one of said plurality of M communication frequencies over the plurality of radio zones.

19. The control station in the automobile communications system of claim 17, comprising:
a reference frequency generator that generates the reference frequency signal for producing the plurality of M communication frequencies in each fixed station;
a communication controller for transmitting and receiving signals to and from the plurality of fixed stations; and
a system controller controlling said one of said plurality of M communication frequencies for the plurality of fixed stations at a predetermined timing in such a way as not to permit simultaneous transmission at a same communication frequency in adjoining radio zones.

20. The system of claim 17, wherein the plurality of M communication frequencies in each radio zone are generated from a single reference frequency.

21. The system of claim 17, wherein the time division scheme is such that each time slot for each radio zone uses a different one of said plurality of M communication frequencies.

22. The automobile communications system of claim 17, wherein each of the plurality of fixed stations comprises:
a frequency generator for generating the plurality of M communication frequencies from the signal of a reference frequency input from the control station;
a selector for selecting one communication frequency in use from the plurality of M communication frequencies under control of the control station;
a time-division controller for allocating one of said N time slots to communication with the on-board mobile station at said one of said plurality of M communication frequencies; and
an interface for transmission and reception of signals to and from the control station.

23. The automobile communications system of claim 22, wherein each of the plurality of M communication frequencies is used for both transmission and reception to perform communication with the on-board mobile station according to a TDMA/TDD (Time Division Multiple Access/Time Division Duplex) scheme.

24. The automobile communications system of claim 22, wherein the frequency generator generates the plurality of M communication frequencies so that the plurality of M communication frequencies are frequency-coherent to the reference frequency wherein each of the plurality of M communication frequencies is used for transmission and reception, and wherein the time-division controller performs communication with the on-board mobile station according to a TDMA/TDD (Time Division Multiple Access/Time Division Duplex) scheme.

25. The automobile communications system of claim 22, wherein the plurality of M communication frequencies comprises a plurality of different pairs of first frequencies and second frequencies, wherein the frequency generator generates the first frequencies from one reference frequency in accordance with a first predetermined conversion so that the first frequencies are in a frequency-coherence state.

26. The automobile communication method according to claim 25, wherein each of the fixed stations generates a reception local frequency from the first frequency in accordance with a second predetermined conversion as used by the on-board mobile station so that the reception local frequency and a radio signal received from the on-board mobile station are in a frequency-coherence state.

27. The automobile communications system of claim 17, wherein the on-board mobile station comprises:
a frequency-in-use regenerator for regenerating said one of said plurality of M communication frequencies from a signal received from a fixed station which forms a radio zone for communication; and
a communication controller controlling communication with the fixed station using the allocated one of said N time slots at said one of said plurality of M communication frequencies.

28. The automobile communications system of claim 27, wherein each of the plurality of M communication frequencies is used for transmission and reception, and the communication controller carries out communication with the fixed station according to a TDMA/TDD scheme.

29. The automobile communications system of claim 27, wherein each of said plurality of M communication frequencies is used for transmission and reception frequencies,
wherein the frequency-in-use regenerator comprises:
a demodulator for demodulating the received signal, and
a phase controller for performing phase control on a signal of an oscillation frequency based on an output of the demodulator such that the demodulator acquires synchronization; and
wherein the communication controller carries out communication with the fixed station according to a TDMA/TDD scheme using the oscillation frequency as a transmission local frequency.

30. The automobile communications system of claim 27, wherein the frequency-in-use regenerator comprises:
a demodulator for demodulating the received signal using an oscillation frequency, and
a phase controller for performing phase control on the signal of the oscillation frequency based on an output of the demodulator such that the demodulator acquires synchronization; and
wherein the on-board mobile station further comprises:
a converter for generating a transmission local frequency from the signal of the oscillation frequency in accordance with the predetermined conversion, and
a modulator for generating a transmission signal using the transmission local frequency.

31. The automobile communication system according to claim 30, wherein the predetermined conversion of the converter is the same as a predetermined conversion for generating a reception local signal from a transmission frequency at each fixed station.

32. The automobile communications system of claim 17, wherein a fixed station of the plurality of fixed stations comprises:
a communication frequency generator that generates the plurality of M communication frequencies from the signal of a reference frequency coming from the control station;
a selector for selecting one communication frequency from the plurality of M communication frequencies under control of the control station;
a time-division controller for allocating one of said N time slots to communication with the on-board mobile station at said one of said plurality of M communication frequencies; and
an interface for implementing transmission and reception of signals to and from the control station.

33. The fixed station of claim 32, wherein each of the plurality of M communication frequencies is used for transmission and reception, and communication with the on-board mobile station is carried out according to a TDMA/TDD scheme.

34. The fixed station of claim 32, wherein each of the plurality of M communication frequencies is used for transmission and reception, the communication frequency generator generates the plurality of M communication frequencies in each radio zone so that the plurality of M communication frequencies are frequency-coherent to the reference frequency, and the time-division controller carries out communication with the on-board mobile station according to a TDMA/TDD scheme.

35. The fixed station of claim 32, wherein the plurality of M communication frequencies comprises a plurality of different pairs of a first frequency and a second frequency, and a reception local frequency for demodulating a received radio signal from the on-board mobile station which is generated from the first frequency in accordance with a second predetermined conversion so that the reception local signal is frequency-coherent to the received radio signal from the on-board mobile station.

36. The fixed station of claim 32, wherein the plurality of M communication frequencies comprises a plurality of different pairs of a first frequency and a second frequency, and the communication frequency generator generates the first frequency from the reference frequency in accordance with a first predetermined conversion in such a manner that those first frequencies are in a frequency-coherence state over the plurality of radio zones.

37. The fixed station of claim 36, wherein the plurality of M communication frequencies comprises a plurality of different pairs of a first frequency and a second frequency, and a reception local frequency for demodulating a received radio signal from the on-board mobile station is generated from the first frequency in accordance with a second predetermined conversion so that the reception local signal is frequency-coherent to the received radio signal from the on-board mobile station.

38. The on-board radio mobile station in the automobile communications system of claim 17, comprising:
a frequency-in-use regenerator for regenerating said one of said plurality of M communication frequencies from a signal received from a fixed station which forms a radio zone for communication; and
a communication controller for communicating with the fixed station using the allocated time slot based on said one of said plurality of M communication frequencies.

39. The on-board radio mobile station of claim 38, wherein each of the plurality of M communication frequencies is used for transmission and reception, and the communication controller carries out communication with the fixed station according to a TDMA/TDD scheme.

40. The on-board radio mobile station of claim 38, wherein each of the plurality of M communication frequencies is used for transmission and reception;
wherein the frequency-in-use regenerator comprises:
a demodulator for demodulating the received signal, and
a phase controller performing phase control on a signal of an oscillation frequency based on an output of the demodulator such that the demodulator acquires synchronization,
wherein the communication controller carries out communication with the fixed station according to a TDMA/TDD scheme by using the oscillation frequency as a transmission local frequency.

41. The on-board radio mobile station according to claim 38, wherein the frequency-in-use regenerator comprises:
a demodulator for demodulating a received signal of an oscillation frequency, and
a phase controller performing phase control on the signal of the oscillation frequency based on an output of the demodulator such that the demodulator acquires synchronization; and
wherein the on-board radio mobile station further comprises:
a converter for generating a transmission local frequency from the signal of the oscillation frequency in accordance with a predetermined conversion, and a modulator for generating a transmission signal using the transmission local frequency.

42. The on-board radio mobile station according to claim 38, wherein the predetermined conversion of the converter is the same as a predetermined conversion for generating a reception local signal from a transmission frequency at each fixed station.

43. An automobile communications method between an on-board mobile station and a fixed station system in a plurality of radio zones which are consecutively arranged along a road, comprising:
providing each of the radio zones with a plurality of communication frequencies;
controlling a communication frequency used in each of the radio zones using a time division scheme such that simultaneous transmission at a same communication frequency is not permitted in adjoining radio zones and different time slots are allocated for communications at a same communication frequency in adjoining radio zones; and
continuously communicating with the on-board mobile station at a same communication frequency over the radio zones,
wherein a predetermined number N (N is an integer equal to or greater than 2) of time slots are determined in one period in each of the radio zones, wherein one time slot is assigned to a single on-board mobile station and M (M is an integer equal to or greater than 2) communication frequencies are sequentially switched from one to another at a timing of every N/M time slot.

44. The automobile communications method of claim 43, wherein the time slot allocated to the on-board mobile station is switched in such a way that the on-board mobile station uses a same communication frequency over the plurality of radio zones.

45. An automobile communications method for an on-board mobile station across a plurality of radio zones which are consecutively arranged along a road, comprising:
providing each of the radio zones with a plurality of M communication frequencies;
providing plurality of N time slots in one period in each of said radio zones;
switching between said plurality of M communication frequencies within each of the radio zones using a time division scheme such that a different one of said N time slots is allocated for adjacent radio zones for each of said plurality of M communication frequencies by sequentially switching from one to another at a timing of every N/M time slot; and
switching a time slot allocated to the on-board mobile station to continuously communicate with the on-board mobile station across the plurality of radio zones, wherein the time division scheme is such that each time slot for each radio zone uses a different one of said plurality of M communication frequencies.

46. An automobile communications method between an on-board mobile station and a fixed station system comprising a plurality of radio zones consecutively arranged along a road, comprising:
providing each of the radio zones with a plurality of M communication frequencies;
providing a plurality of N time slots in one period in each of said radio zones;
switching between said plurality of M communication frequencies within each of the radio zones using a time division scheme such that a different one of said N time slots is allocated for each adjacent radio zone for each of said plurality of M communication frequencies by sequentially switching from one to another at a timing of every N/M time slot; and
continuously communicating with the on-board mobile station at one of said plurality of M communication frequencies over the plurality of radio zones, wherein the time division scheme is such that each time slot for each radio zone uses a different one of said plurality of M communication frequencies.

47. An automobile communications system comprising:
an on-board mobile station movable on a road;
a plurality of fixed stations comprising a plurality of radio zones consecutively arranged on the road, wherein each of the plurality of fixed stations are communicable with the on-board mobile station using a plurality of M communication frequencies; and
a control station providing a plurality of N time slots in one period in each of the radio zones, controlling the plurality of fixed stations performing continuous communication with the on-board mobile station by switching said N time slots in adjoining radio zones with said on-board mobile station using one of said plurality of M communication frequencies in adjoining radio zones, switching one of said N time slots allocated to the on-board mobile station in accordance with the switching in said plurality of fixed stations and by switching between said plurality of M communication frequencies in each of the plurality of radio zones using a time division scheme such that adjoining fixed stations communicate with a plurality of on-board mobile stations using different frequencies of said plurality of M communications frequency at any given time, and sequentially switching said plurality of M communication frequencies from one to another at a timing of every N/M time slots, wherein the time division scheme is such that each one of said N time slots for each radio zone uses a different one of said plurality of M communication frequencies.

48. An automobile communications method for an on-board mobile station across a plurality of radio zones which are consecutively arranged along a road, comprising:
providing each of the radio zones with a plurality of M communication frequencies;
providing a plurality of N time slots in one period in each of said radio zones;
switching between said plurality of M communication frequencies within each of the radio zones using a time division scheme such that a different one of said N time slots is allocated for adjacent radio zones for each of said plurality of M communication frequencies by sequentially switching from one to another at a timing of every N/M time slot; and
switching a time slot allocated to the on-board mobile station to continuously communicate with the on-board mobile station across the plurality of radio zones at one of said plurality of M communication frequencies.

49. An automobile communications method between an on-board mobile station and a fixed station system comprising a plurality of radio zones consecutively arranged along a road, comprising:
providing each of the radio zones with a plurality of M communication frequencies;
providing a plurality of N time slots in one period in each of said radio zones;
switching between said plurality of M communication frequencies within each of the radio zones using a time division scheme such that a different one of said N time slots is allocated for each adjacent radio zone for each of said plurality of M communication frequencies by sequentially switching from one to another at a timing of every N/M time slot; and continuously communicating with the on-board mobile station at one of said plurality of M communication frequencies over the plurality of radio zones.

50. An automobile communications system comprising:

an on-board mobile station movable on a road;

a plurality of fixed stations comprising a plurality of radio zones consecutively arranged on the road, wherein each of the plurality of fixed stations are communicable with the on-board mobile station using a plurality of M communication frequencies; and a control station providing a plurality of N time slots in one period in each of the radio zones, controlling the plurality of fixed stations performing continuous communication with the on-board mobile station by switching said N time slots in adjoining radio zones with said on-board mobile station using one of said plurality of M communication frequencies in adjoining radio zones, switching one of said N time slots allocated to the on-board mobile station in accordance with the switching in said plurality of fixed stations and by switching between said plurality of M communication frequencies in each of the plurality of radio zones using a time division scheme such that adjoining fixed stations communicate with a plurality of on-board mobile stations using different frequencies of said plurality of M communications frequency at any given time, and sequentially switching said plurality of M communications frequencies from one to another at a timing of every N/M time slots.

* * * * *